US012638314B2

(12) United States Patent
Russell et al.

(10) Patent No.: US 12,638,314 B2
(45) Date of Patent: May 26, 2026

(54) SIGNAL PROCESSING METHODS FOR AN OPTICAL DETECTION SYSTEM

(71) Applicant: SINTELA LIMITED, Pill (GB)

(72) Inventors: Stuart Russell, Pill (GB); Andris Egle, Pill (GB)

( * ) Notice: Subject to any disclaimer, the term of this patent is extended or adjusted under 35 U.S.C. 154(b) by 284 days.

(21) Appl. No.: 18/576,194

(22) PCT Filed: Aug. 9, 2022

(86) PCT No.: PCT/EP2022/072327
§ 371 (c)(1),
(2) Date: Jan. 3, 2024

(87) PCT Pub. No.: WO2023/017022
PCT Pub. Date: Feb. 16, 2023

(65) Prior Publication Data
US 2024/0318986 A1 Sep. 26, 2024

(30) Foreign Application Priority Data
Aug. 11, 2021 (GB) ..................................... 2111537

(51) Int. Cl.
*G01D 5/353* (2006.01)
*G01H 9/00* (2006.01)
(52) U.S. Cl.
CPC ......... *G01D 5/35306* (2013.01); *G01H 9/004* (2013.01)
(58) Field of Classification Search
CPC ........................... G01H 9/004; G01D 5/35306
(Continued)

(56) References Cited

U.S. PATENT DOCUMENTS 11,493,367 B2 * 11/2022 Carver ............... G01D 5/35361
11,815,373 B2 * 11/2023 Issa ..................... G01D 5/35361
(Continued)

FOREIGN PATENT DOCUMENTS

GB 2588177 A 4/2021

OTHER PUBLICATIONS

International Search Report and Written Opinion of the International Searching Authorityfor corresponding PCT/EP2022/072327 dated Nov. 14, 2022.
(Continued)

*Primary Examiner* — Dalzid E Singh
(74) *Attorney, Agent, or Firm* — Egbert, McDaniel & Swartz, PLLC

(57) ABSTRACT

Disclosed is a signal processing method for a distributed acoustic sensing system (DAS), including receiving a set of scattered signals, each of which was scattered at a different location along an optical path and corresponds to a respective spatial channel. Each scattered signal is interfered with a local oscillator signal, and processed to generate a complex carrier signal whose modulation is related to an instantaneous frequency of an acoustic modulation at the scattering location. In order to improve the signal-to-noise ratio (SNR), complex carrier signals from multiple spatial channels are summed together, so that an instantaneous frequency corresponding to those channels can be estimated. The generation each complex carrier signal involves using a reference complex carrier signal for that channel. When the estimated instantaneous frequency corresponding to a set of spatial channels fulfils a predetermined condition, the reference complex carrier signal for those spatial channels is updated.

14 Claims, 8 Drawing Sheets

(58) Field of Classification Search
 USPC ......................................................... 398/205
 See application file for complete search history.

(56)                          References Cited

U.S. PATENT DOCUMENTS

|            |       |         |         |              |
|------------|-------|---------|---------|--------------|
| 11,946,799 | B2 *  | 4/2024  | Cai ..................... | G01D 5/35383 |
| 2012/0278043 | A1 * | 11/2012 | Lewis .................... | G01H 9/004   |
|            |       |         |         | 702/189      |
| 2019/0383648 | A1 * | 12/2019 | Austin ............... | G01D 5/35303 |
| 2020/0370948 | A1 * | 11/2020 | Huang ................... | G01H 9/004   |
| 2021/0250087 | A1 * | 8/2021  | Hayward ........... | G01D 5/35358 |

OTHER PUBLICATIONS

Search Report for priority application GB 2111537.3 dated May 4, 2022.

* cited by examiner

SIGNAL PROCESSING METHODS FOR AN OPTICAL DETECTION SYSTEM

TECHNICAL FIELD

The invention relates to signal processing methods for an optical detection system, and systems for carrying out such processing.

BACKGROUND TO THE INVENTION

Distributed Acoustic Sensing (DAS) is an established technology with several commercial systems available. In these systems, a pulse or pulses of laser light are launched into a length of optical fiber and the light that is scattered within the fiber is analysed in order to derive the nature of the acoustic environment, i.e. any physical vibrations, of the fiber transducer. In particular, these systems typically make a measurement of the acoustic strain environment of an optical fiber transducer using an optical time domain reflectometer (OTDR) approach. This gives a differential strain measurement as a function of position along the optical fiber.

As an optical fiber is manufactured it is cooled or quenched from a high temperature as it is drawn. This process leads to the presence of small variations in the density of the optical fibre. These tiny variations in density equate to variations in the effective refractive index of the fiber. These discontinuities lead to scattering of laser light passing through the optical fiber, particularly by Rayleigh scattering. The amplitude of the scattering follows a Rayleigh distribution, but the phase angle of the scattering is uniformly distributed around a unit circle, i.e. $-\pi \leq \phi \leq \pi$ where $\phi$ is the phase angle.

For a single pulse system the length of the fiber limits the pulse repetition frequency (PRF) possible, as only one laser light pulse should interrogate the fiber at a given time. Therefore, a pulse is only sent down the optical fiber when the previous pulse has had time to travel the full length of the fiber and the scattered light return to the detector. As a result, the acoustic environment at any location of the fiber can only be sampled at the PRF and this sets an inherent limit on the maximum acoustic frequency that can be sampled with a single pulse system, related to the Nyquist limit.

Many systems only measure the amplitude of the light scattered by the fiber, which yields a result that correlates to the acoustic field only for small amplitude strains and only when correct fiber scatter bias conditions, i.e. the resulting scatter amplitude and phase as a result of the coherent sum of the scattering of light from all of the scattering sites which are illuminated at a given time, are met. For large acoustic strains or incorrect fiber scatter bias conditions these systems significantly distort the measurement of the acoustic field leading to the generation of higher frequency components which do not truly represent the amplitude or time evolution of the vibrations which are affecting the optical fiber. Systems of this nature however do give a measure of the acoustic energy and have found application for long range installations such as pipeline monitoring and borders, where detection of activity is the primary goal and a truly accurate measurement of the acoustic field is not required. Systems of this nature can be termed 'qualitative' systems. Operational ranges of less than 50 km, and spatial resolutions of the order of more than 20 m at these ranges are typical for such systems.

Other systems simultaneously measure the amplitude and phase of the scattered light, typically by comparing the phase of two sequential pulses or by comparing the phase of one pulse with a delayed copy of itself. In each case, said pulses are allowed to optically interfere and the resulting interference is measured. These systems yield a response which is generally linearly related to the acoustic field and the response provides a much higher dynamic range. Such systems are therefore able to represent much larger strains in the optical fiber and with much greater correlation to the acoustic field than 'qualitative' methods as described above. However, typically the operational range of systems of this nature is limited and therefore are targeted at shorter range applications, for example down hole seismic measurements. Systems of this nature can be termed 'quantitative' systems. Operational ranges of 10 km or less, and spatial resolutions of the order of 10 m are typical for such systems.

Another way of measuring the amplitude and phase of the scattered light in a 'quantitative' system is to use a local oscillator reference signal and measure the phase of the scattered light in relation to this reference. This method is termed coherent detection. Coherent detection has found application in communications and sensors in various forms over the past 30 years. It offers not only a coherent measurement of both phase and amplitude but also a detection noise floor much lower than direct detection methods and hence the potential for improved range and spatial resolution performance when compared to other commercial systems. However the traditional signal processing approach to employing coherent detection to build a DAS system leads to issues which limit these inherent advantages.

The present invention aims to overcome problems with known signal processing techniques applied in acoustic sensing.

SUMMARY OF THE INVENTION

At its most general, the present invention provides a development of the signal processing methods for distributed acoustic sensing (DAS) systems set out in GB 2588177 A, which is incorporated herein by reference. In particular, the invention may enable an improved signal signal-to-noise ratio (SNR) of the DAS system, thus enabling acoustic modulations along an optical path to be determined with greater spatial resolution and over larger distances.

The method of the invention involves receiving a set of scattered signals, each of which was scattered at a different location along an optical path and corresponds to a respective spatial channel. The scattered signal for each spatial channel is interfered with a local oscillator signal, and processed to generate a complex carrier signal whose modulation is related to an instantaneous frequency of an acoustic modulation at the scattering location. In order to improve the SNR of the measurement, complex carrier signals from multiple spatial channels (e.g. corresponding to adjacent scattering locations) are then summed together, so that an instantaneous frequency corresponding to those channels can be estimated. The generation of the complex carrier signal for each spatial channel involves using a reference complex carrier signal for that channel. When the estimated instantaneous frequency corresponding to a set of spatial channels fulfils a predetermined condition, the reference complex carrier signal for those spatial channels is updated. In this manner, the reference complex carrier signal for each of the spatial channels may be dynamically updated based on an output of the method. This may ensure that a suitable reference complex carrier signal is used for each spatial channel, and may avoid deterioration of the measurement over time. In particular, the inventors have found that updating the reference complex carrier signal in this manner may lead to a reduction in noise of the measurement.

According to a first aspect of the invention, there is provided a signal processing method for a distributed acoustic sensing system, the method comprising: receiving, at a detector stage, a set of scattered signals, wherein each scattered signal in the set of scattered signals corresponds to a respective spatial channel and was scattered at a respective location along an optical path; receiving, at the detector stage, a local oscillator signal; for each of the spatial channels: generating, based on an interference of the local oscillator signal and the scattered signal corresponding to that spatial channel, a first complex carrier signal associated with that spatial channel, the first complex carrier signal being modulated by a phase difference between the local oscillator signal and the scattered signal corresponding to that spatial channel; processing the first complex carrier signal to generate a second complex carrier signal associated with that spatial channel, the second complex carrier signal being modulated by a spatial differential of the phase difference, the spatial differential being taken along a length of the optical path; storing an initial second complex carrier signal generated for that spatial channel as a reference complex carrier signal for that spatial channel; and generating a third complex carrier signal associated with that spatial channel, the third complex carrier signal being modulated by a phase difference between the second complex carrier signal and the reference complex carrier signal; summing two or more third complex carrier signals associated with two or more respective spatial channels, to generate a fourth complex carrier signal; determining, based on the fourth complex carrier signal, a value representative of an instantaneous frequency of an acoustic modulation at locations on the optical path corresponding to the two or more respective spatial channels; determining if the value representative of the instantaneous frequency meets a predetermined condition and, if the predetermined condition is met: for each of the two or more respective spatial channels, saving the second complex carrier signal associated with that spatial channel as the reference complex carrier signal for that spatial channel. In other words, the stored value for reference complex carrier signal for that spatial channel is updated with the second complex carrier signal associated with that spatial channel.

The spatial differential of the phase difference is directly related to the strain (or acoustic environment) of the optical path at the scattering location, and so enables the strain at the scattering location to be estimated. Thus, the second complex carrier signal associated with a spatial channel can be used to determine the strain at the corresponding scattering location on the optical path. However, according to the invention, additional processing is performed following generation of the second complex carrier signal, in order to further improve SNR. In particular, generating, for each spatial channel, a third complex carrier signal and then spatially stacking (i.e. summing) the third complex carrier signals may result in a signal with increased amplitude and thus having an improved SNR. This may therefore facilitate determining a value representative of the instantaneous frequency of acoustic modulations along the optical path.

Importantly, the method of the invention may result in an improved SNR prior to the determining of the value representative of the instantaneous frequency, e.g. prior to applying a rectangular to polar coordinate (R-P) transform to the fourth complex carrier signal. As a result, it may be possible to improve accuracy of measurements for longer optical paths, due to the improved SNR which may avoid a threshold for non-linear response of the R-P transform.

The method may comprise transmitting a pulsed test signal along the optical path.

The pulsed test signal may include a series of coherent light pulses which are separated by regular time intervals. A pulse repetition frequency (PRF) of the pulsed test signal may be determined based on a length of the optical path, e.g. such that only a single pulse travels along the optical path at one time. The DAS may include a pulse generator (e.g. an acousto-optic modulator) configured to generate the pulsed test signal.

The optical path may include an optical fiber, which may act as a transducer of the DAS.

The optical path (e.g. optical fiber) may include a plurality of scattering sites distributed along the length of the optical path, e.g. caused by variations in refractive index along the length of the optical path. When a pulse of the pulsed test signal travels along the optical path (e.g. optical fiber), light in the pulse may be scattered at various locations (i.e. at the scattering sites) along the length of the optical path. For example, light in the pulse may be backscattered via Rayleigh scattering of the pulse at various locations along the length of the optical path. Scattering of light in the pulse at a location along the optical path may result in a scattered signal associated with that location. Thus, a pulse of the test signal travelling along the optical path may result in a plurality of scattered signals, each scattered signal having been scattered at a respective location (i.e. scattering site) along the optical path. The scattered signals may be guided back along the optical path, such that they are received by the detector stage.

The optical path (e.g. optical fiber) may be subjected to one or more modulations, such as acoustic modulations, at one or more locations along the optical path. Such modulations may result in a strain at one or more locations along the optical path, which may cause changes in the scattering of the pulsed test signal, e.g. due to local variations in refractive index and length of the optical path.

The location on the optical path at which the scattered signal was scattered (i.e. the scattering location) may be determined based on a time of receipt of the scattered signal at the detector stage. For example, the location on the optical path may be determined by comparing a time at which a pulse of the test signal was launched along the optical path, and the time of receipt of the scattered signal at the detector stage, taking into account the speed of light along the optical path.

The set of scattered signals may include two or more scattered signals. The scattered signals may be received consecutively in time at the detector stage.

Each spatial channel corresponds to a respective scattering location along the optical path.

The DAS includes a detector stage that is arranged to receive scattered signals from the optical path and the local oscillator signal. The detector stage may include an optical detector which is arranged to output a signal that is representative of an intensity of incident light on the detector. For example, the detector stage may include a square law detector. A square law detector may output a signal having an intensity that is proportional to the square of the field amplitude of incident light on the detector. The detector stage may also be referred to herein as a detector system.

The local oscillator signal may be a continuous wave coherent light signal that is interfered with the received scattered signal at the detector stage.

Both the local oscillator signal and the scattered signals may be incident on the detector (e.g. a square law detector) of the detector stage, such that they interfere at the detector. As a result, when a scattered signal is received at the detector, the detector may produce an output signal that is related to an intensity produced by the interference of the local oscillator signal and the scattered signal.

The output signal from the detector may be in the form of a carrier signal (e.g. a real carrier signal) that carries a phase difference between the scattered signal and the local oscillator signal. The first complex carrier signal may then be generated based on the output signal. For example, generating the first complex carrier signal may include passing the output signal through a digital down conversion stage. Thus, the first complex carrier signal is also modulated by a phase difference between the local oscillator and the scattered signal.

Scattering of the pulsed test signal along the optical path may result in a phase shift of the scattered signal relative to the local oscillator signal. As a result, a scattered signal that was scattered at a location along the optical path may have a phase relative to the local oscillator that corresponds to a cumulative sum of any and all phase modulations along the length of the optical path up to that location. Therefore, the phase difference carried by the first complex carrier signal associated with a given spatial channel may correspond to a cumulative sum of phase modulations along a length of the optical path up to the location where the corresponding scattered signal was scattered.

The first complex carrier signal is digitally processed to generate a second complex carrier signal that is modulated by a spatial differential of the phase difference. The spatial differential may represent a variation of the phase difference over a chosen length increment (or gauge length) of the optical path, at the location along the optical path where the scattered signal was scattered. As noted above, it is then possible to determine a value representative of the spatial differential of the phase difference for the location along the optical path, which may enable the strain or acoustic environment of the optical path to be determined.

The second complex carrier signal may be generated using any suitable technique. For example, GB 2588177 A discloses a variety of techniques for generating a second complex carrier signal that is modulated by a spatial differential of the phase difference, all of which are incorporated herein by reference. For instance, processing the first complex carrier signal may comprise multiplying a complex conjugate of the first complex carrier signal with a delayed copy of the first complex carrier signal, to generate the second complex carrier signal. Alternatively, processing the first complex carrier signal may comprise digitally simulating interference of the first complex carrier signal with a delayed copy of the first complex carrier signal, to generate the second complex carrier signal.

Herein, a length increment, gauge length, or delay may be referred to as "chosen" to indicate that it may be set by a user. A "chosen" length increment, gauge length, or delay may also be said to be "predetermined".

For each spatial channel, a reference complex carrier signal is stored. To begin, an initial second complex carrier signal generated for that spatial channel is stored as the reference complex carrier signal. The initial complex carrier signal may correspond to a second complex carrier signal that was generated for that spatial channel, following receipt of an initial (or previous) scattered signal corresponding to that spatial channel. Thus, the reference complex carrier signal may be modulated by a spatial differential of the phase difference between the local oscillator signal and the initial scattered signal.

In more detail, the method may comprise receiving an initial set of scattered signals, and for each spatial channel the initial scattered signal is interfered with the local oscillator signal and used to generate an initial second complex carrier signal which is stored as the reference complex carrier signal for that spatial channel. The method may then comprise receiving a subsequent set of scattered signals, which are processed as discussed herein.

Where the current scattered signal is the first scattered signal received for that spatial channel, then the current second complex carrier signal (i.e. the one generated from the first scattered signal) is stored as the reference complex carrier signal. Subsequently, the reference complex carrier signal may be updated, as discussed further below.

The third complex carrier signal generated for a given spatial channel is modulated by a phase difference between the second complex carrier signal and the reference complex carrier signal for that spatial channel. The phase difference between the second complex carrier signal and the reference complex carrier signal effectively corresponds to an increment (or change) in the second complex carrier signal over a period of time between receipt of a previous (e.g. initial) scattered signal and the current scattered signal for that spatial channel. Thus, the modulation of the third complex carrier signal may effectively correspond to a time differential of the second complex carrier signal.

As a result of the processing steps performed for each of the spatial channels, a set of third complex carrier signals is obtained, each of the third complex carrier signals corresponding to a respective spatial channel (and thus scattering location along the optical path).

Herein, the "instantaneous frequency" (IF) of an acoustic modulation (or perturbation) may refer to a rate of change of the acoustic modulation. Accordingly, by summing (or integrating) the instantaneous frequency over time (i.e. over multiple test pulses), a phase of the acoustic modulation can be determined.

Thus, the time differential (or rate of change) of the spatial differential of the phase difference between the local oscillator signal and the scattered signal for a given spatial channel may correspond the instantaneous frequency of the acoustic modulation at the location on the optical path corresponding to that spatial channel. As a result, the modulation of the third complex carrier signal may be indicative of the instantaneous frequency of the acoustic modulation for the corresponding spatial channel. In this manner, the third complex carrier signal can be used to estimate the instantaneous frequency of the acoustic modulation for a spatial channel.

The inventors have found that, by generating a third complex carrier signal which is modulated as described, it is possible to constructively sum (i.e. spatially stack) multiple third complex carrier signals together, which may lead to an improved SNR.

In particular, a second complex carrier signal may define a vector (or phasor) whose amplitude and angle is proportional to the coherent sum of the scatter sites illuminated at a given position, and whose angular frequency is related to any acoustic modulation occurring at a corresponding location along the optical path. For example, the angular frequency of the phasor may be related to a frequency of a modulation that is applied at a location on the optical path. By effectively modulating the third complex carrier signals by a time differential of the spatial differential of the phase difference, the third complex carrier may define a vector (or phasor) whose amplitude is proportional to the square of the spatial differential carrier amplitude, and whose angle is related to the rate of change of any acoustic modulation at the corresponding location along the optical path. Therefore, for a location which is unperturbed (e.g. there is no strain or acoustic modulation at that location), the angle of the vector defined by the third complex carrier signal may be zero, e.g. it will lie along a "neutral" axis. For a location which is perturbed (e.g. undergoing strain or acoustic modulation), the angle of the vector defined by the third complex carrier signal may be a non-zero angle related to the rate of change of the acoustic modulation.

Accordingly, modulating the third complex carrier signals by the phase difference between the respective second complex carrier signals and the reference complex carrier signals may have the effect of aligning the vectors defined by the third complex carrier signals, so that the third complex carrier signals of multiple spatial channels can be constructively summed in the spatial dimension. In particular, this may have the effect of aligning vectors corresponding to unperturbed locations along the neutral axis, and aligning vectors corresponding to perturbed locations along a common axis. As a result, summing together third complex carrier signals corresponding to scattered signals that were scattered at similar or adjacent locations may result in a constructive sum of the third complex carrier signal.

The step of summing two or more of the third complex carrier signals may correspond to performing a "spatial stack" of the third complex carrier signals, as it involves summing together third complex carrier signals that correspond to different spatial channels, and thus to different locations along the optical path.

The step of summing two or more of the third complex carrier signals may include summing a set of two or more of the third complex carrier signals, wherein the two or more third complex carrier signals correspond to scattering signals that were scattered at adjacent (or neighbouring) locations along the optical path. This may facilitate obtaining a constructive sum of the two or more third complex carrier signals, which may improve the SNR. For example, the set of two or more third complex carrier signals may include eight third complex carrier signals, each of the eight third complex carrier signals corresponding to scattered signals that were scattered from adjacent locations. The number of third complex carrier signals that are summed together may be selected based on a desired spatial resolution of the measurement, as well as the correlation length of the measurement.

The number of third complex carrier signals included in the set of third complex carrier signals may be determined based on a correlation length of acoustic field along the optical path and the required spatial resolution. The scatter phase and amplitude of a second complex carrier signal over a given length of optical path may exhibit a certain correlation (or coherence) length due to the averaging nature of the sum of scatter sites enveloped by the optical pulse. This correlation length may be related to a length of a pulse in the pulsed test signal. For example, the correlation length may correspond to a half-length of a pulse in the pulsed test signal. However the inventors have found that the phasor angle and amplitude of the third complex carrier may exhibit a correlation length that exceeds that exhibited by the second complex carrier, as defined by the pulse and is limited only by the extent of the acoustic modulation and on the chosen spatial gauge length. A length may then be chosen such that a sum of two or more of the third complex carrier signals remains constructive. In other words, the two or more third complex carrier signals that are summed may correspond to locations along the optical path that are within a correlation length of one another.

In some cases, each of the respective locations at which the scattered signals were scattered may be located within a chosen length of the optical path. The chosen length of the optical path may correspond to a correlation length of the acoustic modulation along the optical path. This may serve to ensure that the scattered signals are all correlated, which may result in the corresponding third complex carrier signals being correlated. As a result, a sum of the two or more third complex carrier signals may be constructive.

The fourth complex carrier signal may define a vector that represents the sum of the vectors defined by the two or more third complex carrier signals that were summed together. In other words, a modulation of the fourth complex carrier signal may be related to (i.e. indicative of) an overall change between the respective second complex carrier signals and the respective reference complex carrier signals across two or more respective spatial channels. Indeed, as the modulation of each third complex carrier signal corresponds to the phase difference between the second complex carrier signal and the reference complex carrier signal for its associated spatial channel, the modulation of the fourth complex carrier signal is representative of the overall change in the second complex carrier signals across the two or more respective spatial channels. For example, the modulation of the fourth complex carrier signal may be indicative of an average difference (i.e. phase difference) between the second complex carrier signal and the reference complex carrier signal over the two or more respective spatial channels. Therefore, the fourth complex carrier signal can be used to determine a value representative of the instantaneous frequency of the acoustic modulation for the two or more respective spatial channels. The value representative of the instantaneous frequency may alternatively be referred to as a value representative of a reference differential, where the reference differential is indicative of a difference (e.g. an average difference) between the second complex carrier signal and the reference complex carrier signal over the two or more respective spatial channels.

Following the determining of a value representative of the instantaneous frequency from the fourth complex carrier signal, the value representative of the instantaneous frequency is checked against a predetermined condition. In other words, the value representative of the instantaneous frequency is analysed to determined if it meets the predetermined condition. The predetermined condition may be any suitable condition against which the value representative of the instantaneous frequency can be checked, and various examples of predetermined conditions are discussed in more detail below. By way of example, determining whether the value representative of the instantaneous frequency meets the predetermined condition may comprise comparing the value to a threshold value, comparing the value to a range, and/or comparing the value to a previously determined value of the instantaneous frequency.

The condition being "predetermined" may indicate that the condition has be set or determined in advance of performing the method, e.g. by a user or automatically.

The predetermined condition may relate to a quality (e.g. accuracy, or reliability) of the value representative of the instantaneous frequency. Thus, the predetermined condition may be set such that the value representative of the instantaneous frequency meets the predetermined condition if the value is not an accurate representation of the instantaneous frequency, and that it does not meet the predetermined condition if the value is an accurate representation of the instantaneous frequency. Thus, determining if the value representative of the instantaneous frequency meets the predetermined condition may determining if the value is an accurate representation of the instantaneous frequency (e.g. within a margin of error).

If the value representative of the instantaneous frequency does not meet the predetermined condition, then the reference complex carrier signals may remain unchanged. On the other hand, if the value representative of the instantaneous frequency meets the predetermined condition (e.g. if it is not an accurate representation of the instantaneous frequency), then the reference complex carrier signals for two or more spatial channels that were summed are updated. Specifically in such a case, the reference complex carrier signal of each of the two or more spatial channels is updated to the second complex carrier signal that was determined for that spatial channel. Thus, when subsequent scattered signals are received for those two or more spatial channels, processing will be performed using the updated reference complex carrier signals.

From the above, it will be understood that the determined value representative of the instantaneous frequency represents an estimate of the instantaneous frequency obtained from the fourth complex carrier signal, and that it is not always an accurate representation of the actual instantaneous frequency. For example, if the reference complex carrier signals are maintained for an extended period of time without being updated, the determined value representative of the instantaneous frequency may drift away from the actual instantaneous frequency of acoustic modulations on the optical path. The predetermined condition may therefore be set such that updating of the reference complex carrier signals is triggered when the determined value deviates from the actual instantaneous frequency by a threshold amount. Thus, as long as the predetermined condition is not met, the value representative of the instantaneous frequency may be assumed to provide an accurate estimate of the actual instantaneous frequency.

The inventors have found that updating the reference complex carrier signals in this manner may ensure that determination of the instantaneous frequency remains accurate over time and that a good SNR is maintained with low signal distortion. In particular, this may serve to ensure that the vectors defined by the two or more third complex carrier signals are substantially aligned, so that they can be constructively summed.

Furthermore, the method of the invention may avoid having to update the reference complex carrier signals for each set of received scattered signals, which may reduce an amount of processing required and avoid introducing further noise into the measurement. In particular, the inventors have found that updating the reference complex carrier signal for each set of received scattered signals may introduce 1/F noise into the system, which may become particularly noticeable at larger modulations on the optical path. The method of the invention takes advantage of the realisation that, if the optical path is un-modulated (or "quiet"), then the reference complex carrier signal can be maintained over a significant amount of time, with only minimal 1/F noise and distortion in the output. On the other hand, if the optical path is being modulated to a high degree, the angle of the instantaneous frequency may evolve away from a phasor angle of the reference complex carrier signal. Accordingly, the reference complex carrier signal may be updated more frequently when the optical path is modulated, in order to maintain good system performance. Thus, the reference complex carrier signal may be updated dynamically depending on the amount of modulation experienced by the optical path, to yield a reliable estimate of the instantaneous frequency of the modulation.

A value representative of the spatial differential for a location may be determined by performing a sum over time (i.e. over multiple pulses of the pulsed test signal) of the value indicative of the instantaneous frequency for that location.

In more detail, a reference value of the instantaneous frequency may be stored for the two or more respective spatial channels, the reference value of the instantaneous frequency corresponding the value representative of the instantaneous frequency when the predetermined condition was previously met. The value representative of the spatial differential may then be determined by summing together the most recently determined value representative of the instantaneous frequency and the stored reference value of the instantaneous frequency.

In order to determine the instantaneous frequency for multiple locations along the optical path, the generated third complex carrier signals may be split into multiple sets of two or more third complex carrier signals, wherein each set of third complex carrier signal includes third complex carrier signals corresponding to adjacent locations along the optical path. For example, as mentioned above, a set of third complex carrier signals may include third complex carrier signals corresponding to set of locations along the optical path that lie within a single correlation length of the acoustic modulation. Then, for each set of third complex carrier signals, a fourth complex carrier signal may be determined by summing the third complex carrier signals in that set. The fourth complex carrier signal for each set may then be used to determine an instantaneous frequency of the acoustic modulation for each of the corresponding locations.

Determining the value representative of the instantaneous frequency may include applying a rectangular to polar coordinate transform to the fourth complex carrier signal. This may yield an angle and amplitude of the fourth complex carrier signal, the angle providing a value that is representative of the rate of change of the acoustic modulation, i.e. of the instantaneous frequency of the acoustic modulation at the locations on the optical path corresponding to the two or more summed third complex carrier signals.

Applying the rectangular to polar coordinate transform to the fourth complex carrier signal may include passing the fourth complex carrier signal through a digital down conversion stage. For example, the fourth complex carrier signal may be passed through a digital down conversion stage prior to applying the rectangular to polar coordinate transform.

Generating the third complex carrier signal may comprise multiplying the second complex carrier signal with a complex conjugate of the reference complex carrier signal. The inventors have found that processing the second complex carrier signal and the reference complex carrier signal in this manner yields a third complex carrier signal that is modulated by the phase difference between the second complex carrier signal and the reference complex carrier signal. Alternatively, the process may be performed the other way around, i.e. generating the third complex carrier signal may comprise multiplying a complex conjugate of the second complex carrier signal with the reference complex carrier signal. Other techniques for generating the third complex carrier signal are also contemplated. For example, generating the third complex carrier signal may comprise digitally simulating interference between the second complex carrier signal and the reference complex carrier signal.

In some embodiments, the predetermined condition may be determined to be met if the value representative of the instantaneous frequency is greater than a predetermined threshold value. Thus, if over time the value representative of the instantaneous frequency evolves beyond the predetermined threshold value, then the predetermined condition is determined to be met and the reference complex carrier signal is updated. In particular, an increasing value of the instantaneous frequency may indicate that the optical path is undergoing modulation, and that the reference complex carrier signal should be updated in order to ensure accurate determination of the instantaneous frequency. The threshold value may be any suitable value, and may be determined by a user.

As an example, the value indicative of the instantaneous frequency may be an angle (e.g. obtained by applying an R-P transform to the fourth complex carrier signal), and the threshold value may be a threshold angle. For instance, the inventors have found that a threshold angle of $\pi/2$ may serve to ensure adequate measurement results.

In some embodiments, the method may further comprise storing a reference value of the instantaneous frequency associated with the two or more respective spatial channels; and comparing the value representative of the instantaneous frequency to the reference value, to determine if the predetermined condition is met. In this manner, it is possible to reliably determine when the predetermined condition is met and the reference complex carrier signal should be updated. For example, the predetermined condition may be met when a difference between the reference value and the value representative of the instantaneous frequency exceeds a predetermined threshold. Thus, if the value representative of the instantaneous frequency evolves away from reference value over time, the predetermined condition may be met, thus triggering updating of the reference complex carrier signal. The reference value of the instantaneous frequency may correspond to an initial value representative of the instantaneous frequency that was determined for the two or more spatial channels, i.e. following receipt of an initial set of scattered signals.

Where the third complex carrier signals are split into multiple sets of two or more third complex carrier signals as mentioned above, then a respective reference value of the instantaneous frequency may be stored for each set of two or more third complex carrier signals. In this manner, a respective reference value may be stored for respective sets of scattering locations along the optical path, e.g. to take into account differences in acoustic modulations at different locations along the optical path.

If the predetermined condition is determined to be met, then the value representative of the instantaneous frequency may be stored as the reference value associated with the two or more respective spatial channels. In this manner, the reference value of the instantaneous frequency may be updated when the predetermined condition is met. Thus, when the predetermined condition is met, both the reference value of the instantaneous frequency for the two or more spatial channels and the reference complex carrier signals for those two or more spatial channels may be updated. Accordingly, if the optical path undergoes modulations, the determined value of the instantaneous frequency may evolve away from the reference value of the instantaneous frequency, causing the predetermined condition to be met and the reference value of the frequency to be updated to the most recently determined value representative of the instantaneous frequency. Updating the reference value of the instantaneous frequency in this manner may serve to ensure that the determined value of the instantaneous frequency and the reference value of the instantaneous frequency do not significantly drift apart over time. Thus, as the reference value of the instantaneous frequency is updated each time the predetermined condition is met, an accuracy with which the reference complex carrier signal is updated can be improved. In particular, the reference complex carrier signal may only be updated when there are changes in the instantaneous frequency of the acoustic modulation of the optical path compared to the reference value of the instantaneous frequency. This may reduce an overall frequency at which the reference complex carrier signal is updated, as unneeded updates may be avoided, which may in turn reduce introduction of noise into the system.

The value representative of the instantaneous frequency may comprise an angle of the instantaneous frequency, and the reference value of the instantaneous frequency may comprise a reference angle; and the predetermined condition may be met if a difference between the angle of the instantaneous frequency and the reference angle exceeds a predetermined threshold. Thus, similarly to the discussion above, if the angle of the instantaneous frequency evolves away from the reference angle, then the predetermined condition will be met, triggering updating of the reference complex carrier signal. The threshold angle may be set in order to achieve a desired accuracy and SNR of the measurement. In particular, the smaller the threshold angle, the more frequently the predetermined condition is likely to be met, and so the more frequently the reference complex carrier signal will be updated. The predetermined threshold may be set depending on the application and/or modulation amplitude of the optical path. As an example, the predetermined threshold may be set to $\pi/2$, as this may ensure that vectors representative of the fourth complex carrier signal remain within a same quadrant. This may minimise distortion in the output of the measurement. However, other angles may also be selected as the predetermined threshold.

In some embodiments, the method may further comprise: determining, as a stack amplitude, an amplitude of a phasor representing the fourth complex carrier signal; determining, for each of the two or more respective spatial channels, an amplitude of a phasor representing the third complex carrier signal associated with that spatial channel; determining, as a summed amplitude, a sum of the amplitudes of the phasors representing the third complex carrier signals associated with the two or more respective spatial channel; and comparing the stack amplitude and the summed amplitude, to determine if the predetermined condition is met. Thus, in this scenario, updating of the complex carrier signals is triggered based on a comparison of the stack amplitude and the summed amplitude. The stack amplitude, i.e. the amplitude of the phasor representing the fourth complex carrier signal, will always be less than or equal to the summed amplitude, i.e. the sum of the amplitudes of the phasors representing the two or more third complex carrier signals that were summed to generate the fourth complex carrier signal. When the optical path undergoes modulations, alignment of the phasors representing the two or more third complex carrier signals may decrease. As a result, the stack amplitude may decrease compared to the summed amplitude, which may reduce an SNR of the fourth complex carrier signal. Accordingly, triggering updating of the reference complex carrier signals based on a comparison between stack amplitude and the summed amplitude may ensure that the SNR of the fourth complex carrier signal is maintained above a desired level, by avoiding excessive misalignment of the phasors of the two or more third complex carrier signals.

The predetermined condition may be met if a difference between the summed amplitude and stack amplitude exceeds a predetermined threshold. This may serve to ensure that a certain level of misalignment of the phasors of the two or more third complex carrier signals triggers updating of the reference complex carrier signals. The predetermined threshold may be set based on the application in which the method is used, e.g. based on a tolerance of the application to signal distortion. In general, a smaller predetermined threshold may provide better 1/F noise but increased signal distortion, whilst a higher predetermined threshold may provide poorer 1/F noise but better less signal distortion. For example, where the DAS system is used for perimeter security, the predetermined threshold may be set relatively high. On the other hand, where the DAS system is used for seismic measurements, the predetermined threshold may be set relatively low. The predetermined threshold may, for example, correspond to a percentage of the summed amplitude. For example, the predetermined condition may be determined to be met if the difference between the summed amplitude and stack amplitude exceeds a value between 18-30% of the summed amplitude.

In some embodiments, determining if the value representative of the instantaneous frequency meets the predetermined condition includes comparing the value representative of the instantaneous frequency with a second value representative of the instantaneous frequency, wherein the second value representative of the instantaneous frequency was determined using a different signal processing method. Thus, the method of the invention may involve applying multiple signal processing methods for determining values representative of the instantaneous frequency, and comparing the values obtained using the different signal processing methods. If a difference between the second value representative of the instantaneous frequency and the value determined using the present method exceeds a predetermined threshold, then the predetermined condition may be met. This may serve to ensure a reliability and accuracy of the value representative of the instantaneous frequency.

The different stacking method may employ a different technique for spatially stacking complex carrier signals. In this manner, the outputs of different spatial stacking methods may be compared to ensure their reliability. For example, the different stacking method may correspond to one of the spatial stacking methods disclosed in GB 2588177 A.

In some cases a first signal processing method may be used for determining a first value representative of an instantaneous frequency of an acoustic modulation at a location on the optical path, and a second signal processing method may be used for determining a second value representative of the instantaneous frequency. The first signal processing method may be a method according to the first aspect of the invention. The second signal processing method may be any suitable method for determining the instantaneous frequency of the acoustic modulation on the optical path. If a difference between the first value representative of the instantaneous frequency and the second value representative of the instantaneous frequency exceeds a predetermined threshold, then the predetermined condition may be met, such that the reference complex carrier signals are updated. As an example, the second signal processing method may be the signal processing method described in GB 2588177 A with reference to FIG. 7 and claims 10-17 of that publication. As another example, the second signal processing method may be a phase domain processing method.

Determining the value representative of the instantaneous frequency may comprise: splitting the fourth complex carrier signal into a fifth complex carrier signal and a sixth complex carrier signal, wherein the fifth complex carrier signal comprises a high frequency component of the fourth complex carrier signal, and the sixth complex carrier signal comprises a low frequency component of the fourth complex carrier signal; applying a first rectangular to polar coordinate transform to the fifth complex carrier signal; applying a second rectangular to polar coordinate transform to the sixth complex carrier signal; performing a phase unwrapping process on an output of the second rectangular to polar coordinate transform; and combining an output of the first rectangular to polar coordinate transform and an output of the phase unwrapping process. In this manner, separate R-P transforms may be applied to the high and low frequency components of the fourth complex carrier signal. In particular, the phase unwrapping process may be performed on the low frequency component of the fourth complex carrier signal, which may have a lower bandwidth and higher SNR compared to the overall fourth complex carrier signal. This feature takes advantage of the realisation that, often, the fourth complex carrier signal has larger components at low frequencies, and relatively small components at higher frequencies. As a result, splitting the fourth complex carrier signal into high and low frequency components in this way may provide a much higher tolerance to phase unwrapping errors, thus improving an accuracy of the determined value for the instantaneous frequency.

The method may further comprise: splitting the local oscillator signal or each of the scattered signals into a first polarisation state and a second polarisation state; performing, for each polarisation state, the steps for generating a third complex carrier signal associated with a spatial channel, to generate for each spatial channel a third complex carrier signal corresponding to the first polarisation state and a third complex carrier signal corresponding to the second polarisation state; and for each spatial channel, summing the third complex carrier signal corresponding to the first polarisation state and the third complex carrier signal corresponding to the second polarisation state, to generate a summed third complex carrier signal for each spatial channel; wherein generating the fourth complex carrier signal comprises summing two or more summed third complex carrier signals associated with two or more respective spatial channels.

Thus, in addition to spatially stacking the third complex carrier signals as discussed above, third complex carrier signals may be generated for each polarisation state and summed together, in order to further improve SNR of the system. In particular, by generating, for each polarisation state, a third complex carrier signal that is modulated as described, it is possible to constructively sum the third complex carrier signal for each polarisation state, which may result in an improved SNR. Indeed, similar to the discussion above in relation to the spatial stacking of the third complex carrier signals, modulating the third complex carrier signals as described may effectively align phasors that are representative of the third complex carrier signals, which enables them to be constructively summed. Therefore, a fourth complex carrier signal, which results from the sum of the third complex carrier signals for each polarisation state may provide an improved SNR, which may facilitate determining a value representative of the instantaneous frequency.

The first polarisation state and the second polarisation state may be different polarisation states. The first polarisation state and second polarisation state may be orthogonal, e.g. the first polarisation state may correspond to a vertical polarisation state, and the second polarisation state may correspond to a horizontal polarisation state.

The local oscillator signal or the scattered signals may be split into the first and second polarisation states using a polarising beam splitter.

The detector stage may include a first detector and a second detector which are configured to detect a respective polarisation state. For example, where the local oscillator is split into the first and second polarisation states, the first detector may be configured to detect interference of the scattered signal with the first polarisation state of the local oscillator signal; and the second detector may be configured to detect interference of the scattered signal with the second polarisation state of the local oscillator signal.

Where the local oscillator signal is split into the two polarisation states, the first complex carrier signal associated with a given polarisation state may be generated based on an interference of the scattered signal and that polarisation state of the local oscillator signal. On the other hand, where the scattered signal is split into the two polarisation states, the first complex carrier signal associated with a given polarisation state may be generated based on an interference of that polarisation state of the scattered signal and the local oscillator signal.

Following the processing steps of the method discussed above, a third complex carrier signal associated with the first polarisation state and a third complex carrier signal associated with the second polarisation state are generated for each spatial channel. Summing the third complex carrier signals associated with each polarisation state may correspond to "polarisation stacking" of the third complex carrier signals.

In some cases, there may be two or more polarisation states, in which case a respective third complex carrier signal may be generated for each of the two or more polarisation states. Then, all of the third complex carrier signals for may be summed together to generate the summed third complex carrier signal for the corresponding spatial channel.

The method of the first aspect of the invention may be implemented using a distributed acoustic sensing system. Therefore, a second aspect of the invention provides a distributed acoustic sensing system comprising: a detector stage configured to receive a set of scatter signals that were scattered at locations along an optical path; and a controller configured to perform a method according to the first aspect of the invention.

Features described above in relation to the first aspect of the invention may be shared with the system of the second aspect of the invention. In particular, features described above relating to components of the distributed acoustic system may be included in the system of the seventh aspect of the invention. Additionally, the system of the seventh aspect of the invention may include features set out in the detailed description, e.g. in relation to FIG. 1.

The controller may be a computing device or processor that is configured to control the DAS and perform the required processing steps. For example, the controller may have software or firmware installed thereon for performing the steps of the methods described above. In some cases, the controller may be implemented by a field-programmable gate array (FPGA).

The distributed acoustic sensing system may further include a pulse generator configured to transmit a pulsed test signal along an optical path.

In some embodiments, the distributed acoustic sensing system may be a heterodyne detection system, e.g. a frequency of the test signal may be shifted relative to a frequency of the local oscillator signal. In other embodiments, the DAS may be a homodyne detection system, in which case the frequency of the pulsed test signal and the local oscillator signal may be the same.

The distributed acoustic sensing system may be an optical time domain reflectometer.

In some embodiments, the distributed acoustic sensing system may be a polarisation diverse detection system. For example, the system may be configured to measure different polarisation states, e.g. vertical and horizontal polarisation. In such a case, the processing stage of the system may be configured to perform steps of the methods described above for each of the polarisation states measured by the system.

The DAS may include a coherent light source which is configured to emit continuous wave coherent light. Light emitted by the coherent light source may be split (e.g. by a beam-splitter) between two paths, so that a first portion of the light from the coherent light source is transmitted along a local oscillator path, and a second portion is transmitted a pulse generator which is configured to generate the pulsed test signal.

The DAS system may be a polarisation diverse system. For example, the local oscillator signal or the scattered signal may be split into components having different polarisations, e.g. vertical and horizontal polarisation. The detector stage may then include a detector for each polarisation state, such that a separate analysis of the signals may be performed for each polarisation state. This may serve to ensure that interference of the scattered signal and local oscillator signal can be detected for at least one of the polarisation states, e.g. in cases where polarisation of the scattered signal varies relative to polarisation of the local oscillator signal.

BRIEF DESCRIPTION OF THE DRAWINGS

An embodiment of the invention is discussed below in more detail with reference to the accompanying drawings, in which.

DETAILED DESCRIPTION; FURTHER OPTIONS AND PREFERENCES

Distributed Acoustic Sensing System—Optical Time Domain Reflectometer

Figure 1:
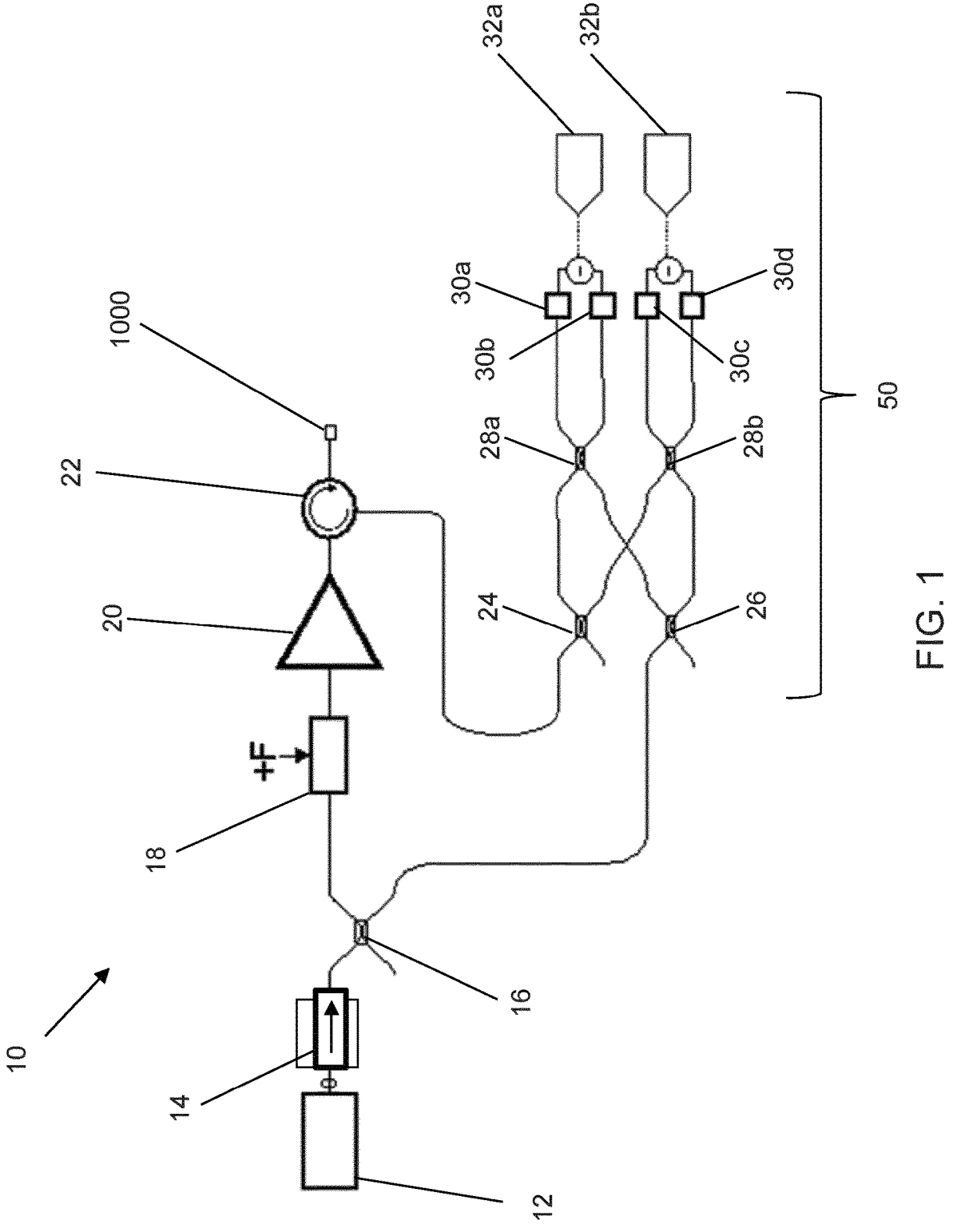
FIG. 1 is a diagram of a conventional local oscillator based optical time domain reflectometer system.

FIG. 1 shows a diagram of a distributed acoustic sensing system in the form of a local oscillator based optical time domain reflectometer (OTDR) system 10. The system 10 is arranged to interrogate an optical path, in particular an optical fiber 1000, which may be of any desirable length for a given purpose.

The system 10 comprises a light source which produces coherent light, which is given here as a laser 12, and is used in continuous wave (CW) operation. The light produced by the laser 12 is directed into an optical isolator 14 to ensure that light is not passed back to the laser 12. After passing through the isolator 14, the light is split into two paths by an optical coupler 16 or beam splitter. The first path, from which light is directed into the fiber 1000 is known as the launch path. The second path, from which light is passed directly to a detection system 50 (discussed below), is known as the local oscillator path. The light is split between the two paths by the optical coupler 16 such that 90% of the incoming light is directed into the launch path, and 10% of the incoming light is directed into the local oscillator path. Of course, the ratio of incoming light directed into each path may be chosen by the operator depending on the nature of the operation for which the OTDR system 10 is used.

The laser light which is directed into the launch path then passes through a pulse generator, such as an acousto-optic modulator (AOM) 18. The AOM 18 is a device which can simultaneously generate an optical pulse as well as upshift or downshift the frequency of light by an amount equal to the radiofrequency which drives the AOM 18. This is shown in FIG. 1 by the +F frequency being introduced to the AOM 18. This frequency, F, may be known as the intermediate frequency or the difference frequency. In this way, the AOM 18 is able to generate a pulsed test signal which may be between 5 ns and 100 ns in duration, but not limited to this range. Of course, any preferred method of generating a pulse of light may be used, such as an electro-optic modulator (EOM). The pulsed test signal may also be referred to herein as a launch pulse.

The pulse of light is then amplified using an optical amplifier 20. The amplified light pulse is introduced to the optical fiber 1000 via an optical circulator 22, which has three ports. The amplified light pulse enters the circulator 22 through a first port, where it is passed to a second port in order to enter the optical fiber 1000. As the pulse of light passes through the fiber 1000, a fraction of the light is backscattered from the fiber 1000 by Rayleigh scattering and a further fraction captured and guided back towards the circulator 22. The scattered light, which may be referred to herein as a scattered signal, enters the circulator 22 at the second port, and leaves the circulator 22 to enter a detection stage 50 via a third port.

The detection stage 50 has two inputs. The first input is the scattered laser light from the third port of the circulator 22. The second input is the laser light taken directly from the local oscillator path mentioned above. In a first part of the detection stage 50, the scattered laser light is divided into two paths, for example using a polarising beam splitter (PBS) 24. The PBS 24 splits the scattered light into a horizontally polarised state and a vertically polarised state. The PBS 24 is used as the polarisation of the pulse of light directed through the launch path and also of the scattered light will evolve as a function of distance as it passes through the optical fiber. The PBS 24 therefore ensures polarisation diverse detection, such that a signal is always detected for any polarisation state of light scattered by the optical fiber 1000. The local oscillator (LO) light, which is highly polarised, is also split equally between two paths using a polarisation maintaining optical coupler 26. In other embodiments, the LO signal may be split into two polarisation states in preference to the scattered signal as described.

The scattered light is then mixed with the LO light in each of the horizontal and vertical states at two optical couplers 28a, 28b. The light from each output of the optical couplers 28a, 28b is then allowed to interfere on a square law detector 30a, 30b, 30c, 30d. The difference of the signal from each detector pair 30a and 30b, 30c and 30d is then taken and measured at an analog-digital-converter 32a, 32b.

The system 10 described above makes use of a heterodyne sensing approach, wherein the frequency of the local oscillator and of the launch pulse are shifted relative to one another by the AOM 18. The difference in these two frequencies should be larger than the bandwidth required to represent the scattering without allowing crosstalk between the carrier and the DC terms which are also generated (see below), allowing the phase and amplitude information of the scattering to be recovered using a real carrier. Another method employs a complex carrier detection stage, replicating the polarisation diverse detection stage for two copies of the local oscillator shifted by 90 degrees relative to each other. This allows detection via a complex carrier, allowing either the positive sidelobe or the negative sidelobe of the resulting interference signal to be recovered independently. This allows homodyne operation whereby the local oscillator signal and launch pulse operate at the same optical frequency.

Figure 2:
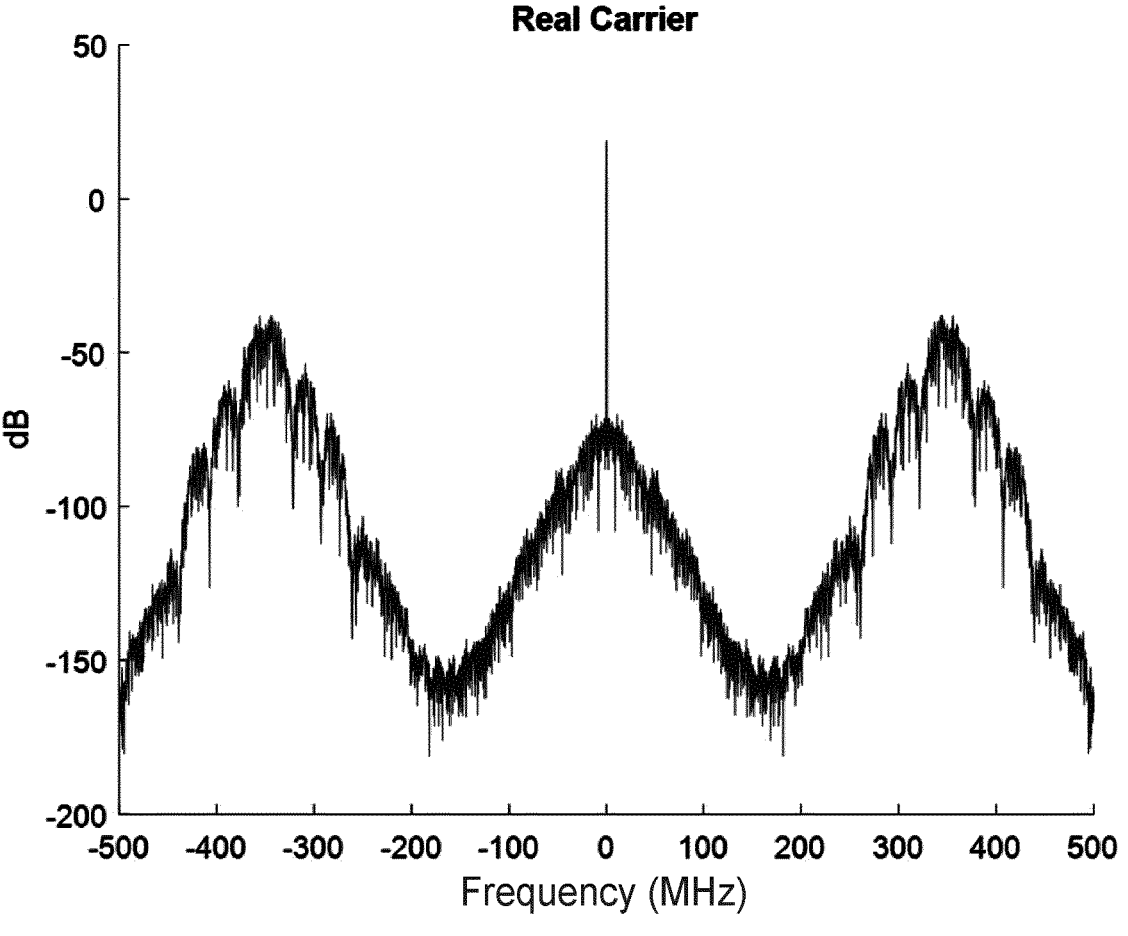
FIG. 2 shows the frequency domain of a simulated detector trace for a local oscillator based optical time domain reflectometer system as shown in FIG. 1.

FIG. 2 is a simulated detector trace showing the detection spectrum for a local oscillator based optical time domain reflectometer system implemented with heterodyne coherent detected, as discussed above with respect to FIG. 1. In the depicted example, the difference frequency between the local oscillator and the launch path pulse is 350 MHz. A treatment of the interference of two waves is given below, and the resulting terms are distinguishable in the simulated detector trace of FIG. 2. Note that for illustrative purposes a noise contribution is not included in the spectrum of FIG. 2.

A treatment of the interference of two waves for the system shown in FIG. 1 is shown below.

$$E_S = \frac{1}{2} E_{Sn} \left( e^{i(\phi_{sn}(t) - \omega_s t)} + e^{-i(\phi_{sn}(t) - \omega_s t)} \right) \tag{1}$$

Equation (1) shows the E-field resulting from scattering within the optical fiber at a position n, with phase $\phi_{sn}$ and frequency $\omega_S$.

$$E_{LO} = \frac{1}{2} E_{LOn} \left( e^{i(\phi_{LOn}(t) - \omega_{LO} t)} + e^{-i(\phi_{LOn}(t) - \omega_{LO} t)} \right) \tag{2}$$

Equation (2) shows the E-field of the local oscillator at a position n, with phase $\cap_{LO_n}$ and frequency $\omega_{LO}$.

When these two waves interfere, and are observed by a square law detector, the resulting intensity is given by equation (3), below:

$$I_{Det} = (E_S + E_{LO}).(E_S + E_{LO})^* \tag{3}$$

This can be expanded and simplified to:

$$I_{Det} = \frac{1}{4}|E_s|^2 + \frac{1}{4}|E_{LO}|^2 + \frac{1}{4}|E_s||E_{LO}|\left[e^{i(\phi_{sn}(t)-\phi_{LOn}(t)-(\omega_s-\omega_{LO})t)} + \right.$$
$$e^{-i(\phi_{sn}(t)-\phi_{LOn}(t)-(\omega_s-\omega_{LO})t)} + e^{i(\phi_{sn}(t)+\phi_{LOn}(t)-(\omega_s+\omega_{LO})t)} + $$
$$\left. e^{-i(\phi_{sn}(t)+\phi_{LOn}(t)-(\omega_s+\omega_{LO})t)}\right]$$

It can be seen that this generates a DC term related to the scattered light intensity; a DC term related to the local oscillator intensity; a negative frequency term which is centred at the difference frequency between the local oscillator and scattered light waves; and a positive frequency term which is centred at the difference frequency between the local oscillator and scattered light waves. The positive and negative frequency terms also carry information about the phase difference between the local oscillator and scattered light waves at a time, t. As a result, it is only necessary to analyse one of the positive or negative frequency terms in order to recover the phase and amplitude information, e.g. by analysing either one of the two sidebands shown in FIG. 2.

In order to recover information relating to the phase and amplitude of the signal, the signal typically undergoes digital down conversion to recover only the positive frequency term, followed by rectangular to polar coordinate transformation yielding the instantaneous phase and amplitude of the signal as a function of time. This process is equivalent to a complex multiplication and has the effect of shifting the positive frequency term, or carrier, down to DC and then filtering the signal to remove what was the DC terms and the negative frequency term. That is, the recovered signal is around the positive frequency peak shown on the right hand side of FIG. 2. At this stage since the wanted bandwidth and hence the bandwidth of the low pass filter is less than the carrier frequency, there is in effect a complex carrier at baseband, centred at 0 Hz. The in-phase and quadrature components are then passed to a rectangular-to-polar coordinate transform, yielding the instantaneous phase and amplitude of the carrier as a function of time.

Application to Digital Acoustic Sensing

A DAS system measures the acoustic field, i.e. vibrations, along a distributed length of optical fiber forming a transducer. The acoustic field is typically regarded as a modulating strain field with variations occurring in the acoustic frequency band. The DAS system can therefore measure small changes in the length of the optical fiber. Since strain acting on an optical fiber has the effect of both modulating the length of the fiber and its refractive index, the phase of scattered light is a direct measure of the optical path experienced by the probing pulse of light launched into the fiber. However, there is also the added complexity of the scattering phase at each point. It is therefore necessary to measure the change in optical phase over a given measurement gauge length to account for the effect of the scattering phase. The coherent detection method yields a result which is a cumulative phase difference acquired over the entire length of the optical fiber up to the point at which the probing pulse is backscattered towards the detector. To obtain an instantaneous phase difference rather than the cumulative phase, it is therefore necessary to calculate the difference in phase over the decided gauge length. In particular, the difference in phase between two locations, n and n+1, can be calculated by taking a spatial differential along the length of the fiber, as shown by equation 4.

$$(\phi_{s(n+1)} - \phi_{LO(n+1)}) - (\phi_{sn} - \phi_{LOn}) \tag{4}$$

As the term $(\phi_{LOn} - \phi_{LO(n+1)})$ is constant throughout the local oscillator signal, equation 4 can be used to determine the spatial differential of the scattered modulated phase along the length of the fiber. The advantage of this method that the measurement gauge length (i.e. the difference between positions n and n+1) can be decided after data acquisition. After the spatial differential is taken a series of phase data for each location is obtained which represents the optical path difference over the given spatial gauge at each location along the fiber. The phase from each location can then be unwrapped and the acoustic signal at each location can be plotted and output. This method of signal processing and phase recovery is known as 'phase domain processing'.

As noted above, a polarisation diverse detection system is used as the polarisation state of the scatter evolves with distance, and hence some locations may yield no carrier signal whatsoever as the LO and scatter field may be cross polarised. In situations like this the orthogonal channel however should yield a strong signal. It is therefore necessary to combine the response from both polarisation channels. However, since the scatter field for each polarisation state will effectively be independent, the absolute phase of the signals generated from each polarisation channel will be different and thus combination is difficult. Typically the two channels are combined in the phase domain around an average DC phase weighted by the single-to-noise ratio or power spectral density of the signal yielded for each location.

'Phase domain processing' does, however, lead to problems for DAS systems. In particular, the rectangular-to-polar (R-P) coordinate conversion step has non-linear performance in the presence of noise, and the spatial differential of phase in this method can only be performed after the R-P coordinate conversion.

As the length of the optical fiber increases, the level of the returned scatter signal reduces due to the losses of the optical fiber. The noise bandwidth of the R-P coordinate conversion is set by the pulse repetition frequency (PRF) and at some point the level of the scatter signal reduces to a level where the noise in band approaches the non-linear threshold of the R-P coordinate converter.

Typically the PRF is of the order of kHz but the target acoustic frequency range is perhaps a few 100 Hz. One known improvement is to reduce the demodulation bandwidth prior to the R-P coordinate converter, which reduces the noise in-band and hence allows operation down to lower signal-to-noise ratios than are possible without limiting the demodulation bandwidth. However, this creates an additional problem in that the phase response prior to spatial differential is a cumulative phase picked up from the fiber up to the scattering point and the effects of reduced demodulation bandwidth needs to be accounted for. If the rate of change of phase exceeds the demodulation bandwidth, either due to its frequency or its amplitude, then 'overscale' occurs, i.e. where the system can no longer track the phase and a phase jump occurs. Since the system is tracking the cumulative phase up to the point of scattering, as larger distances along the optical fiber are considered the probability that the cumulative phase will overscale increases. Over the long fiber length which is used for typical applications the probability of cumulative phase overscale is almost certain. If, however, the demodulation bandwidth is left at Nyquist (i.e. the intrinsic limit from the PRF) then the distortion components mirror from Nyquist and even in the presence of cumulative overscale a spatial differential is valid and the true spatial differential of phase can be recovered. This leads to an effective range and/or spatial resolution limitation when the phase domain processing is used.

If, however, the demodulation bandwidth is reduced, information required to create a valid spatial differential is fundamentally lost and this leads to cumulative overscale, effectively destroying downstream information required for the spatial differential to remain valid. Again, this results in a range and/or spatial resolution limitation for the phase domain processing.

The present invention aims to overcome the problems that occur with these known processing methods.

A signal processing method according to an embodiment of the invention will now be described with reference to FIG. 3, which shows a schematic diagram 300 of the method. The signal processing method 100 may make use of an optical time domain reflectometer such as that shown in FIG. 1, though the detection stage may be altered as required to work with the processing method 100 described herein. The steps of the method may be carried out by a controller of the system having appropriate software or firmware installed thereon. In some cases, the controller may be implemented by a field-programmable gate array (FPGA).

In a first step, the method may comprise transmitting, with a coherent light source such as a laser, a pulsed test signal along an optical path, such as the optical fiber 1000. Preferably, the coherent light source may operate in a continuous wave mode, wherein the continuous wave may be pulsed, for example using an acousto-optic modulator (AOM) generally as described above with respect to FIG. 1. In particular, the optical path may be an optical fiber such that vibrations of the optical fiber may be detected using the method described herein.

Following transmission of the pulsed test signal along the optical path, the method comprises receiving a set of scattered signals, each of which was scattered at a respective location along the optical path. The scattered signals are received at a detector stage, such as a detection stage of an OTDR. As each of the scattered signals was scattered at a respective location along the optical path, each scattered signal is considered as belonging to a respective spatial "channel" of the system. In other words, each spatial channel of the system corresponds to a respective scattering location along the optical path. The scattered signals will be received sequentially in time due to their different scattering locations along the optical path, such that each scattered signal can be assigned to its corresponding spatial channel based on its time of receipt at the detector stage. A local oscillator signal is also received by the detector stage. For example, the detector stage may be a detector stage 50 as described above.

When the scattered signal for a given spatial channel (i.e. corresponding to a respective scattering location on the optical path) is received, it is interfered with the local oscillator in order to generate a first complex carrier signal that is modulated by a phase difference between the local oscillator signal and the scattered signal. For example, the scattered signal and the local oscillator signal may be interfered using the detection stage 50 discussed above, with an analog-to-digital converter 32a, 32b configured to output a real carrier signal that is representative of the interference between the local oscillator signal and the scattered signal. The output from the analog-to-digital converter (ADC) may then be provided to a digital down converter 302 (shown in FIG. 3), which is configured to output a first complex carrier signal associated with the spatial channel, the first complex carrier signal being modulated by the phase difference between the local oscillator signal and the scattered signal.

The digital down converter 302 may perform any suitable processes to generate the first complex carrier signal from the output of the ADC. As an example, the output of the ADC may be split into two parts, with one part being multiplied by an in-phase component (cos ωt) and one part being multiplied by a quadrature component (−sin ωt). This has the effect of shifting the carrier signal down, such that the desired positive frequency term is centred at DC. Each of these parts may then be passed through a respective lowpass filter to remove the unwanted terms, and the outputs of the lowpass filters are recombined into a complex signal, which is the first complex carrier signal.

The first complex carrier signal is then processed to generate a second complex carrier signal associated with the spatial channel. The second complex carrier signal is modulated by a spatial differential of the phase difference, the spatial differential being taken along a chosen length of the optical path. Generation of the second complex carrier signal may be achieved in various different ways, such as those discussed in relation to FIGS. 4-6 of GB 2588177 A. In the example of FIG. 3, the first complex carrier signal is processed to generate the second complex carrier signal by multiplying the first complex carrier signal with a complex conjugate of the first complex carrier signal, where the complex conjugate of the first complex carrier signal is delayed with a delayed by a chosen gauge delay. Specifically, after the digital down converter 302, the first complex carrier signal is split into two copies. A first copy of the first complex carrier signal is delayed 304 by an amount equal to the gauge length set by an operator. This gauge length effectively decides the spatial resolution of the system, as it determines the distance between locations n and n+1 as shown in equation (4) above. The delayed copy of the first complex carrier signal then undergoes complex conjugation 306, following which it is multiplied 308 with the second (unmodified) copy of the first complex carrier signal, resulting in the second complex carrier signal that is modulated by the spatial differential of the phase difference. The second complex carrier signal, being generated in this way, therefore carries the spatial differential phase of the scattered signal.

In other examples, generating the second complex carrier signal may comprise digitally simulating interference of the first complex carrier signal with a delayed copy of itself. Such digital simulation may comprise generating a copy of the first complex carrier signal, wherein a frequency shift is introduced between the first complex carrier signal and the copy of the first complex carrier signal, and wherein the copy of the first complex carrier signal is delayed relative to the first complex carrier signal; adding the first complex carrier signal and the copy of the first complex carrier signal together to produce a summed complex carrier signal; and multiplying the summed complex carrier signal with a complex conjugate of the summed complex carrier signal, to generate the second complex carrier signal. Preferably, this frequency shift is larger than a bandwidth required to adequately represent scattering of the test signal along the optical path whilst avoiding crosstalk with the DC baseband signal. For example, where the optical path is an optical fiber such as in an OTDR system, the scattering may be Rayleigh scattering.

Figure 3:
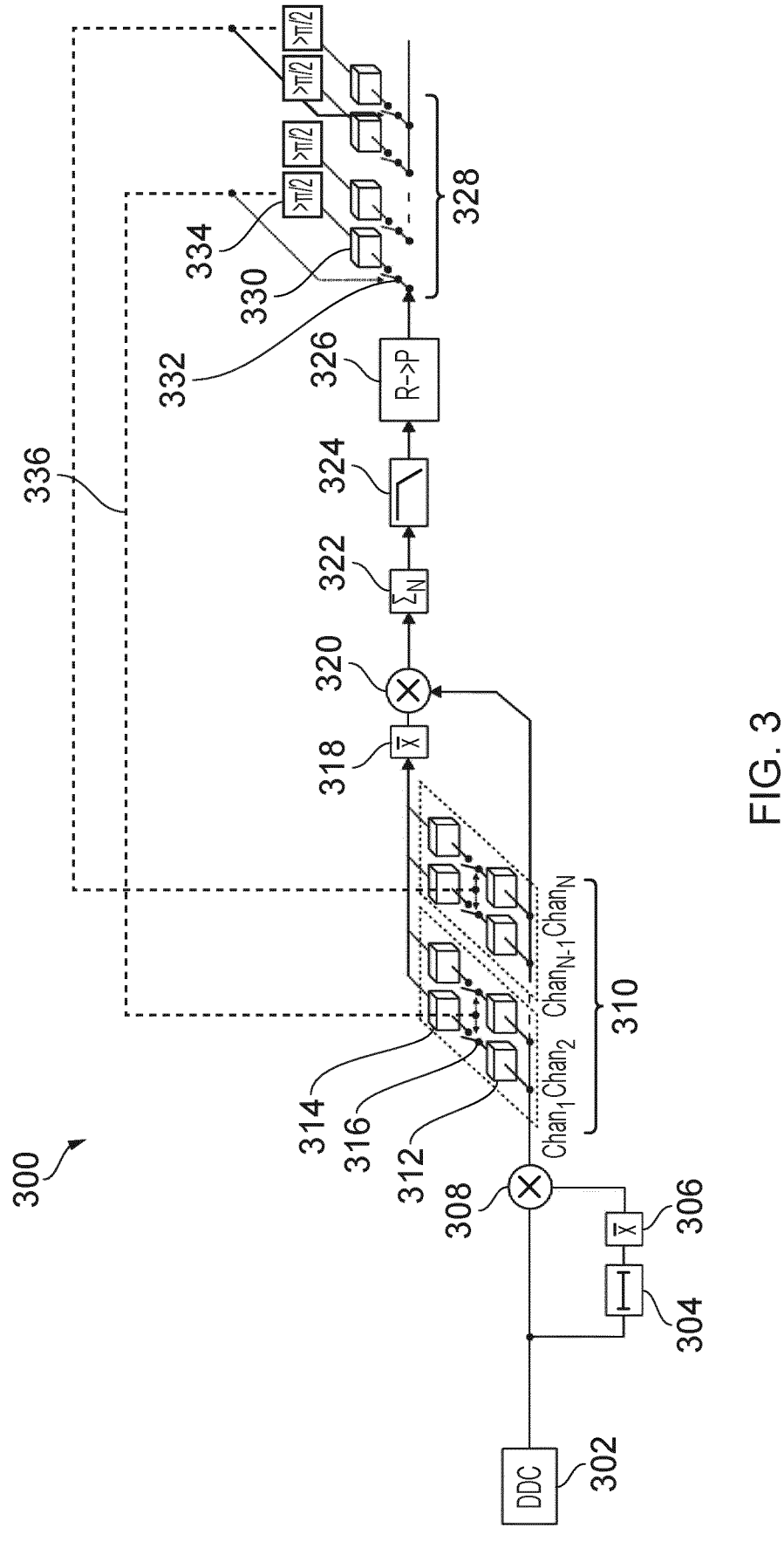
FIG. 3 shows a schematic diagram of a signal processing method according to an embodiment of the invention.

Each spatial channel of the system is associated with a respective pair of memory locations 310, as shown in FIG. 3. Following generation of the second complex carrier signal for a given spatial channel, a copy of the second complex carrier signal is stored in a first memory location 312 associated with that spatial channel. Thus, as a scattered signal for each spatial channel is received in turn, a second complex carrier signal is generated for that spatial channel, and a copy of the second complex carrier signal is stored in the first memory location 312 associated with that spatial channel. If the current second complex carrier signal is the first (or initial) one generated for the spatial channel, then a copy of the second complex carrier signal is also stored in a second memory location 314 associated with that spatial channel. As shown in FIG. 3, the first memory location 312 and second memory location 314 are connected via a switch 316, which can be closed so that the second complex carrier signal stored in the first memory location 312 can be copied to the second memory location 314. The copy of the second complex carrier signal that is stored in the second memory location 314 is subsequently used as a reference complex carrier signal for the corresponding spatial channel. Note that, in some cases, it may not be necessary to provide a dedicated memory location (i.e. the first memory location 312) for storing the second complex carrier signal. Instead, the second complex carrier signal may form part of a data stream that is generated by the system, and the second complex carrier signal may simply be recovered from the data stream when/if needed. The data stream may include an indication of the spatial channel associated with each second complex carrier signal in the data stream, such that the relevant second complex carrier signal can be recovered from the data stream. Thus, the second complex carrier signal associated with a given spatial channel may be obtained from the data stream, and stored as the reference complex carrier signal for that spatial channel.

The reference complex carrier signal for a spatial channel (stored in second memory location 314) then undergoes complex conjugation 318, and is multiplied 320 by the second complex carrier signal associated with that spatial channel. This results in a third complex carrier signal associated with that spatial channel, the third complex carrier signal being modulated a phase difference between the second complex carrier signal and the reference complex carrier signal. It should be noted that other techniques may be used for generating the third complex carrier signal, other to that shown in FIG. 3. As noted above, the reference complex carrier signal may correspond to a copy of an initial second complex carrier signal generated for the spatial channel. Thus, when a subsequent second complex carrier signal is generated for that spatial channel, the phase difference between the second complex carrier signal and the reference complex carrier signal effectively corresponds to an increment (or change) in the second complex carrier signal over a period of time between receipt of the initial scattered signal and the most recent scattered signal for that spatial channel. Thus, the modulation of the third complex carrier signal may effectively correspond to a time differential of the second complex carrier signal. As a result, the modulation of the third complex carrier may be indicative of a rate of change (i.e. the instantaneous frequency) of an acoustic modulation on the optical path at a location corresponding to the spatial channel.

Where the current second complex carrier signal is the first (or initial) one generated for the spatial channel, then the second complex carrier signal will effectively be multiplied by a complex conjugate of itself (as in this case the reference complex carrier signal is a copy of the current second complex carrier signal). Therefore, the initial third complex carrier signal generated for the spatial channel will be biased at zero, so that the measurement will start from zero. The modulation of subsequent third complex carrier signals generated for the spatial channel will then be indicative of a change relative to the reference complex carrier signal stored for that spatial channel.

Processing each of the spatial channels in this manner results in generation of a respective third complex carrier signal for each spatial channel. Noting that complex carrier signals may be represented as phasors, the angle of a phasor representing a third complex carrier signal may thus be related to the instantaneous frequency of the acoustic modulation for the corresponding spatial channel. So, for an unperturbed spatial channel (i.e. where there is no acoustic modulation), the phasor representing the third complex carrier signal may lie along the neutral axis. On the other hand, for a perturbed spatial channel (i.e. undergoing acoustic modulation), the angle of the phasor representing the third complex carrier signal may be proportional to the rate of change of the acoustic modulation, i.e. the instantaneous frequency. In other words, phasors corresponding to unperturbed locations may be aligned along the neutral axis, whilst phasors corresponding to perturbed locations may be aligned along a common axis. The inventors have found that such an alignment of the phasors enables third complex carrier signals corresponding to scattered signals that were scattered at similar or adjacent locations to be summed constructively, thus resulting in an improved SNR.

Thus, a sum 322 of third complex carrier signals across multiple spatial channels is performed. In particular, third complex carrier signals corresponding to two or more adjacent spatial channels are summed together, to produce a fourth complex carrier signal. For example, eight samples of the third complex carrier signal may be summed, each corresponding to scattered signals that were scattered from adjacent locations on the optical path. However, the number of third complex carrier samples that are summed together may be selected based on a desired spatial resolution of the measurement, and may also be dependent on the sampling rate, data rate and pulse length. The sum 322 may be referred to as a 'spatial stack', as it corresponds to summing (stacking) signals corresponding to different locations along the optical path.

Optionally, the fourth complex carrier signal may then be passed through a filter 324, to reduce noise bandwidth. The filter 324 may be a low pass filter that operates on the real and imaginary components of the signal (e.g. an 'IQ' filter). For example, the filter may be implemented using a moving average, an infinite impulse response (IIR), a finite impulse response (FIR), or any other suitable digital filter.

As noted above, the fourth complex carrier signal is generated by summing the third complex carrier signals from two or more spatial channels together. Thus, the modulation of the fourth complex carrier signal may be related to an instantaneous frequency of acoustic modulation at locations on the optical path corresponding to the two or more spatial channels. The spatial channels of the system may be split up into multiple sets of two or more spatial channels. Then, the third complex carrier signals for a set of spatial channels may be summed together in order to generate the fourth complex carrier signal for that set of spatial channels.

The fourth complex carrier signal is used to determine a value representative of the instantaneous frequency of the acoustic modulation at the corresponding scattering locations. In the example of FIG. 3, this is done by applying a rectangular-to-polar coordinate transform 326 to the fourth complex carrier signal. Passing the fourth complex carrier signal through the rectangular-to-polar transform 326 produces a signal that is representative of the instantaneous frequency (i.e. the rate of change of the spatial differential of the phase difference). In particular, the rectangular-to-polar coordinate transform 326 may output an angle of a phasor that represents the fourth complex carrier signal. The angle of the phasor may be related (e.g. proportional to) the instantaneous frequency.

Figure 4A:
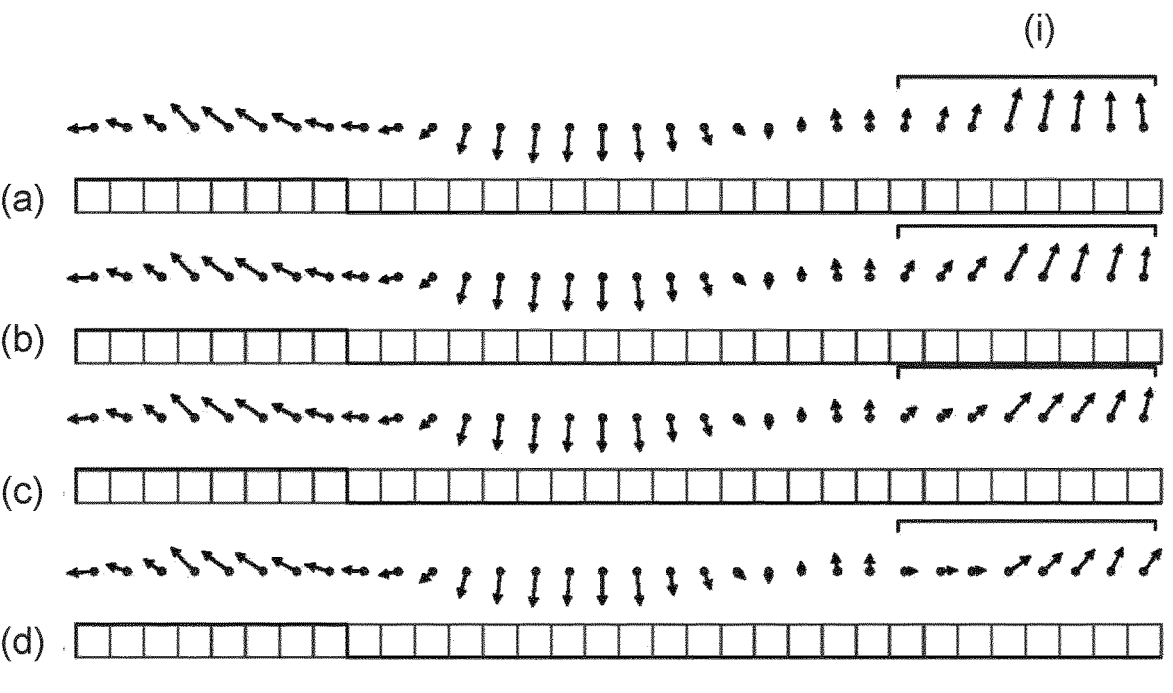
FIG. 4a-4c each show vector representations of carrier signals during a signal processing method according to an embodiment of the present invention.
Figure 4B:
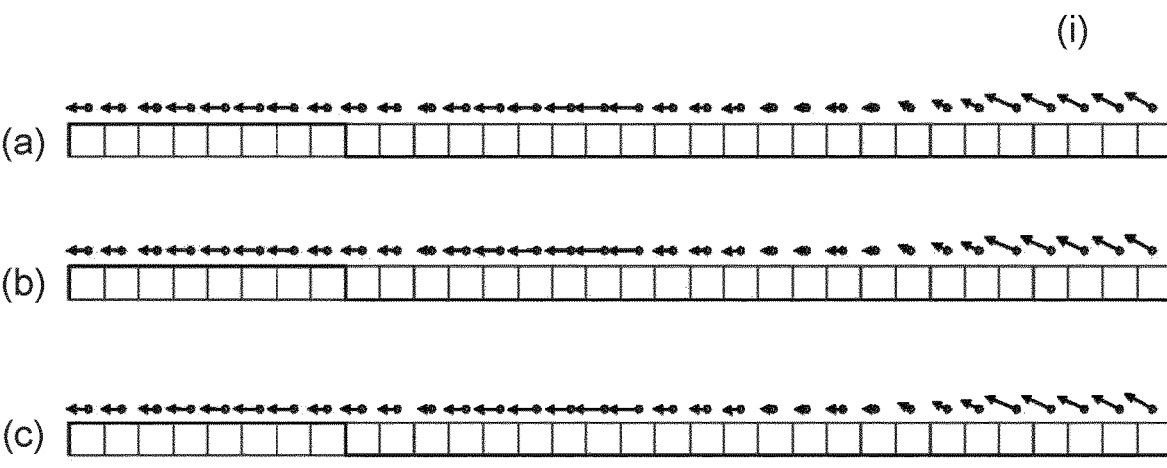
Figure 4C:
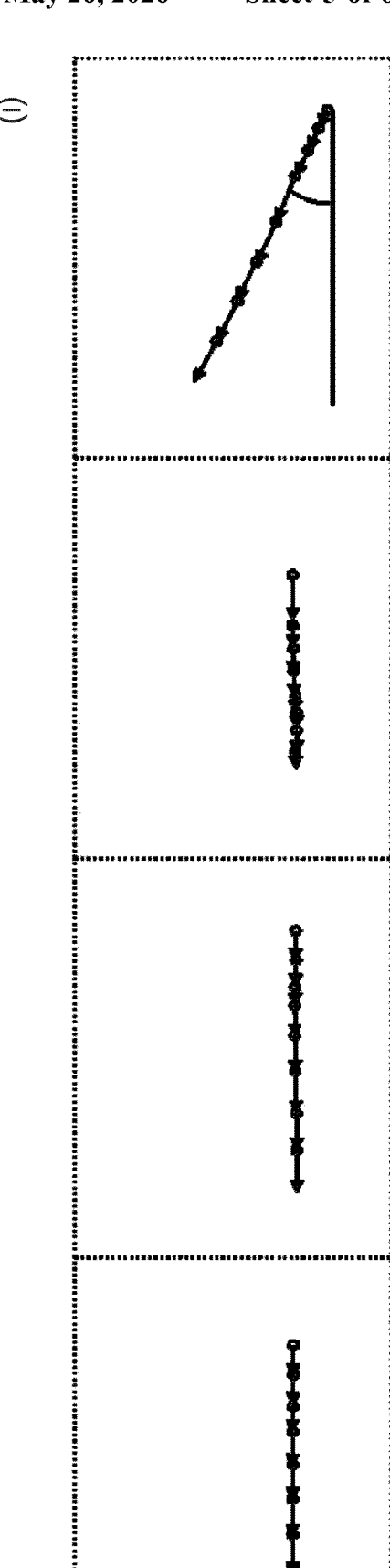

To method outlined above is illustrated in FIGS. 4a-4c. The optical path is depicted horizontally in FIGS. 4a-4c. As shown in FIGS. 4a and 4b, the optical path is split up into a series of spatial channels corresponding to different locations along the optical path. FIG. 4a shows a vector (or phasor) representing the second complex carrier signal for each spatial channel, and for a series of test pulses (a)-(d). The vector for each spatial channel shows the spatial differential of the phase difference between the local oscillator signal and the scattered signal. In this example, the optical path is modulated by an acoustic frequency at section (i).

FIG. 4b shows a vector representing the third complex carrier signal for each spatial channel, and for a series of pulses (a)-(c), wherein the third complex carrier signal is modulated as described above. In particular, the third complex carrier signal is modulated by a phase difference between the current second complex carrier signal and the reference complex carrier signal (which corresponds to a previously determined second complex carrier signal for that spatial channel). As discussed above, the vector representing the third complex carrier signal may be representative of the instantaneous frequency of the acoustic modulation for the corresponding spatial channel. It can be seen that all of the vectors are aligned along the neutral axis, except in section (i), where the optical path is modulated by an acoustic frequency and so the vectors are aligned at an angle equal to the rate of change of the modulation. It can also be seen that a weighting has been applied. As a result, the lengths of the vectors are normalised relative to the time average of the amplitudes for each respective spatial location across pulses (a)-(d).

FIG. 4c shows the results of the spatial stacking process on third complex carrier signals, for example signal (a) shown in FIG. 4b. The spatial stacking produces a fourth complex carrier signal, which is represented as a single vector for four sets of eight adjacent points of the optical path. In other words, spatial stacking was performed across sets of eight adjacent spatial channels. As a result, when R-P coordinate conversion is applied, the signal-to-noise ratio is greatly improved, e.g. compared to the signals shown in FIGS. 4a and 4b. The vector representing the fourth complex carrier signal contains information of the phase difference for each of the respective sections along the optical path, and the acoustic modulation applied in section (i) can be clearly seen. By subjecting the fourth complex carrier signal to R-P coordinate conversion, a value representative of the instantaneous frequency and amplitude of the acoustic modulation can be estimated. By summing the value representative of the instantaneous frequency with a stored reference value of the instantaneous frequency, the phase of the acoustic modulation can be recovered, as described in more detail below.

As discussed above, the phase angle obtained by applying the R-P coordinate transform to the fourth complex carrier signal may provide a value that is representative of the instantaneous frequency of acoustic modulations on the optical path. In particular, the inventors have found that the phase angle provides an accurate representation of the actual instantaneous frequency for small amplitude acoustic modulations, or where the reference complex carrier signals are updated regularly. On the other hand, with larger amplitude acoustic modulations or where the reference complex carrier signals are not updated for an extended period of time, the inventors have found that the phase angle obtained from the R-P transform may no longer provide an accurate representation of the actual instantaneous frequency. The method of the invention therefore provides a technique for updating the reference complex carrier signals for the spatial channels at appropriate times, to ensure that the output of the R-P transform provides a reliable estimate of the instantaneous frequency.

Returning to FIG. 3, the method of the invention further includes a process for determining when to update the reference complex carrier signal associated with a spatial channel (i.e. stored in second memory location 314). This is done by analysing the value representative of instantaneous frequency that is output by the R-P transform 326, and corresponding to the two or more spatial channels across which the spatial stack was performed, to determine whether a predetermined condition is met. If the predetermined condition is met, then the reference complex carrier signals associated with each of the two or more spatial channels are updated. Specifically, for each of the two or more spatial channels, the current second complex carrier signal (which is stored in first memory location 312) is copied to the second memory location 314 to make it the new reference complex carrier signal for that spatial channel. This may be done, for example, by closing the switch 316, to enable the current second complex carrier signal to be copied to the second memory location 314. Then, when subsequent signals are processed for the two or more spatial channels, the updated reference complex carrier signals will be used to generate the third complex carrier signals.

The inventors have found that, if the optical path is unmodulated, then the reference complex carrier signals can be maintained over a significant time, and still yield an accurate estimate of the instantaneous frequency. Maintaining the reference complex carrier signals over time may minimise 1/F noise and distortion experienced at the output. On the other hand, if the optical path is modulated to a high degree, the instantaneous frequency may evolve away from the reference complex carrier signals. As a result, the vectors representing the third complex carrier signals that are summed together may fall out of alignment, such that the spatial stack is no longer completely constructive. As a result, the fourth complex carrier signal may no longer provide an accurate indication of the instantaneous frequency.

Figure 5:
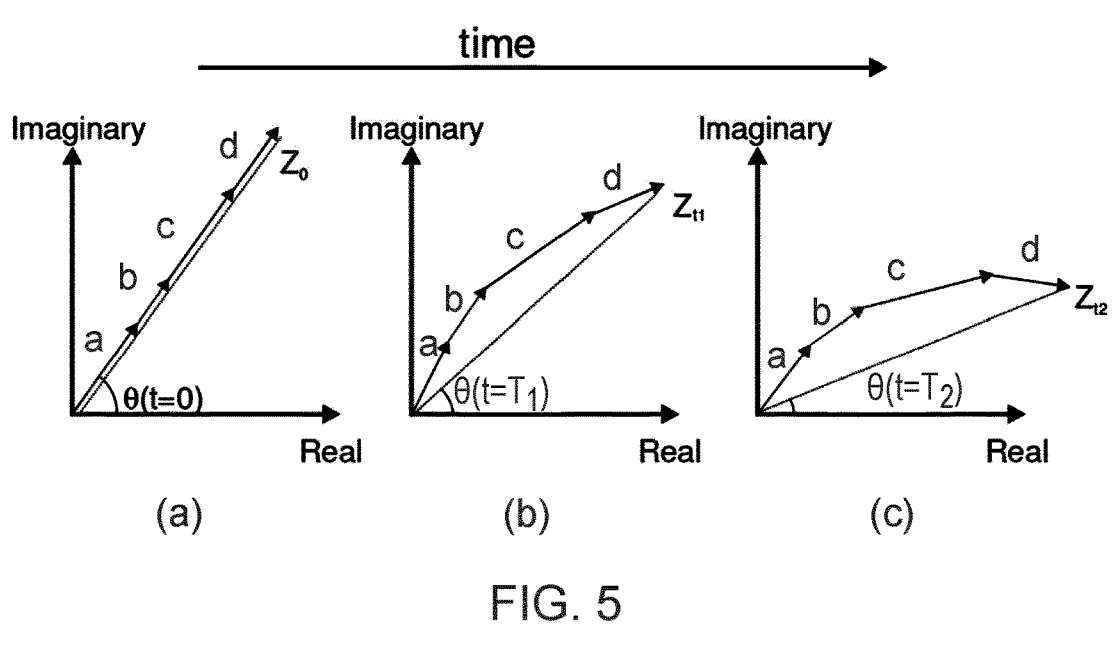
FIG. 5 shows vector representations of fourth complex carrier signals at different points in time during a signal processing method according to an embodiment of the present invention.

This process is illustrated in FIG. 5, which shows evolution of the spatial stack over time for a modulated optical path. Panel (a) of FIG. 5 shows a phasor $Z_0$ that represents the instantaneous frequency of the optical modulation, as obtained from scattered signals received at time t=0. The phasor $Z_0$ corresponds to a spatial stack (sum) of four phasors (a, b, c, d), corresponding to the third complex carrier signals of four adjacent spatial channels. As can be seen, at t=0, the four phasors (a, b, c, d) are aligned along a common axis, and so produce a constructive sum. As the phasors to be stacked are computed with reference to a reference complex carrier signal taken at some previous time, different spatial channels are expected to experience different modulation depths with time. Additionally, the phase and amplitude of each of the phasors (a, b, c, d) may evolve over time. Panel (b) of FIG. 5 shows the instantaneous frequency phasor $Z_{t1}$ at time t=1, whilst panel (c) shows the instantaneous frequency phasor $Z_{t2}$ at time t=2. As can be seen, modulation of the optical path causes the phasors (a, b, c, d) to become progressively misaligned over time, resulting in linearity of the stack to diverge.

The predetermined condition against which the instantaneous frequency is checked is set so as to trigger updating of the reference complex carrier signals if a quality of the spatial stack decreases by a threshold amount. In particular, updating of the reference complex carrier signals may be triggered if it is determined that phasors representing the two or more third complex carrier signals are out of alignment, e.g. by more than a predetermined threshold. In other words, the predetermined condition may be met if the sum across the two or more spatial channels is no longer sufficiently constructive. As the summed phasors evolve and the spatial stack becomes more non-linear, the level of distortion and signal degradation may increase. However, for long optical paths, the generation of 1/F noise (which may be caused by frequent updating of the reference complex carrier signals) may be more detrimental to system performance. Therefore, to ensure optimal performance, the rate at which the reference complex carrier signals are updated should be minimised (as this may reduce 1/F noise), whilst maintaining an adequate quality of the spatial stack. The method of the invention may thus ensure that the reference complex carrier signals are updated only when needed to avoid deterioration of the output, whilst minimising 1/F noise. There are various possible metrics for determining the quality of the spatial stack and when to trigger updating of the reference complex carrier signals, as discussed below.

In the example of FIG. 3, each set of two or more spatial channels (i.e. each set of spatial channels across which a spatial stack is performed) is associated with a respective pair of memory locations 328, as shown in FIG. 3. Following the output (by the R-P transform 326) of an initial value representative of the instantaneous frequency corresponding to a set of two or more spatial channels, the initial value representative of the instantaneous frequency is stored as a reference value of the instantaneous frequency in a first memory location 330 associated with the set of two or more spatial channels. As shown, a switch 332 is connected between the output of the R-P transform 326 and the first memory location 330. The switch 332 can be closed to enable the value representative of the instantaneous frequency to be copied to the first memory location 330. A second memory location 334 associated with that set of two or more spatial channels stores information relating to a predetermined condition for that set of two or more spatial channels. Thus, for each set of two or more spatial channels, a reference value of the instantaneous frequency is stored in the corresponding first memory location 330, and information relating to a predetermined condition is stored in the second memory location 334.

If the predetermined condition is determined to be met for one of the sets of two or more spatial channels, then the switches 316 associated with each of the two or more spatial channels may be closed. Additionally the switch 332 associated with that set of two or more spatial channels may be closed. This causes, for each of the two or more spatial channels, the current second complex carrier signal to be stored as the reference complex carrier signal for that channel. Additionally, this causes the current value of the instantaneous frequency to be stored as the reference instantaneous frequency for the set of two or more spatial channels. Thus, the reference instantaneous frequency may be updated at the same time as the reference complex carrier signals. In the example shown in FIG. 3, the spatial channels are grouped into sets of two for performing the spatial stack. Thus, when the predetermined condition is determined to be met for a set of two spatial channels, a signal is conveyed to the switch 332 corresponding to that set to close the switch 332, and a signal is conveyed to the switches 316 for each of the two corresponding spatial channels to close the switches 316, as indicated by the dashed line 336.

In one example, the predetermined condition may correspond to a threshold value for the instantaneous frequency. Thus, a threshold value may be stored in the second memory location 334. For instance, the angle of the instantaneous frequency output for a set of two or more spatial channels from the R-P transform 326 may be compared to the threshold value, and if the angle of the instantaneous frequency exceeds the threshold value, then updating of the reference complex carrier signals may be triggered, e.g. by closing switches 316 and 332 as discussed above. For example, the inventors have found that $\pi/2$ may be a suitable threshold angle for triggering update of the reference complex carrier signals. However, other threshold values may be used, depending on desired noise characteristics of the output.

As another example, determining whether the predetermined condition is met for a set of two or more spatial channels may involve comparing the current value of the instantaneous frequency to the stored reference value of the instantaneous frequency for that set of two or more spatial channels. Then, if a difference between the current value of the instantaneous frequency and the reference value of the instantaneous frequency exceeds a predetermined threshold, updating of the reference complex carrier signals may be triggered, e.g. by closing switches 316 and 332 as discussed above. Thus, if a non-linearity of the spatial stack increases and the instantaneous frequency evolves away from the reference value, the predetermined condition may be met. More specifically, an initial angle of the instantaneous frequency determined for a set of two or more spatial channels may be stored as the reference value of the instantaneous frequency in the first memory location 330 for that set. Then, a subsequent value of the angle of the instantaneous frequency determined for that set of two or more spatial channels (e.g. output from the R-P transform 326) may be compared with the reference value stored in the first memory location 330. If a difference between the reference value and the subsequent value of the angle of the instantaneous frequency exceeds a predetermined threshold angle, then the predetermined condition may be determined to be met, thus triggering updating of the reference complex carrier signals for the two or more spatial channels. The predetermined threshold angle may be stored in the second memory location 334.

Figure 6:
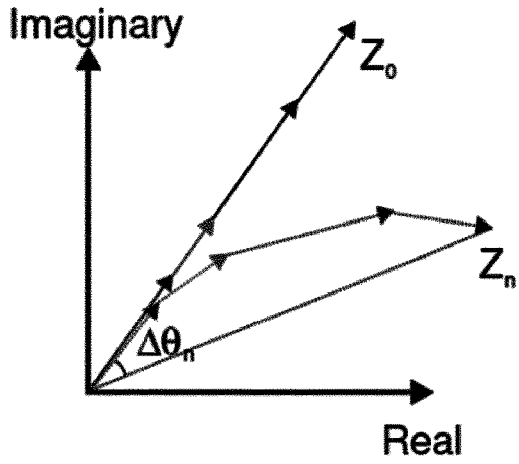
FIG. 6 shows vector representations of fourth complex carrier signals at different points in time during a signal processing method according to an embodiment of the present invention.

This procedure is illustrated in FIG. 6, which depicts an instantaneous frequency phasor $Z_0$ that results from a spatial stack over a set of four spatial channels, at time t=0. An angle of the phasor $Z_0$ is stored as a reference value of the instantaneous frequency for those spatial channels. If the optical path undergoes modulation, linearity of the stack diverges over time. Thus, as shown in FIG. 6, a time t=n (n>0), the instantaneous frequency phasor $Z_n$ for the four spatial channels is rotated relative to the reference phasor $Z_0$ by an angle $\Delta\theta_n$. If the difference in angle $\Delta\theta_n$ between the reference phasor $Z_0$ and the current instantaneous frequency phasor $Z_n$ is greater than a predetermined threshold (e.g. stored in the second memory location 334), then the predetermined condition is determined to be met, and the reference complex carrier signals for the four spatial channels are updated. Likewise, the reference value of the instantaneous frequency for the four spatial channels may be updated to correspond to an angle of the instantaneous frequency phasor $Z_n$.

Figure 7:
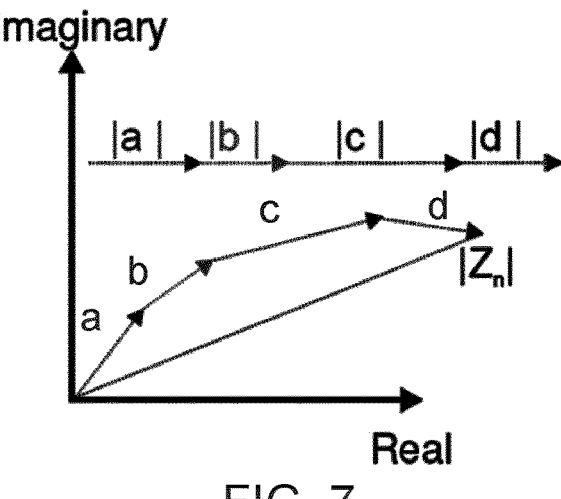
FIG. 7 shows a vector representation of a fourth complex carrier signal during a signal processing method according to an embodiment of the present invention.

As a further example, determining whether the predetermined condition is met for a set of two or more spatial channels may involve monitoring a magnitude of the stacked phasor. This procedure is illustrated in FIG. 7. FIG. 7 shows a phasor $Z_n$ that represents the instantaneous frequency for a set of four adjacent spatial channels, obtained by summing four phasors (a, b, c, d), corresponding to the third complex carrier signals of those spatial channels. An amplitude $|Z_n|$ of the phasor $Z_n$ is determined, which corresponds to a stack amplitude. Additionally, an amplitude of each of the four phasors (a, b, c, d) is determined. In general although a SNR of the third complex carrier signals may not be sufficient to directly determine an angle of the instantaneous frequency from the third complex carrier signals, it is typically possible to determine the amplitudes of the phasors for the third complex carrier signals. The amplitudes of the four phasors (a, b, c, d) are then summed, providing a summed amplitude $A=|a|+|b|+|c|+|d|$. The stack amplitude $|Z|$ is then compared to the summed amplitude A, and if a difference between the stack amplitude and the summed amplitude exceeds a predetermined threshold, then the predetermined condition is determined to be met. The idea here is that the summed amplitude must always be greater than or equal to the stack amplitude. As linearity of the stack decreases, the stack amplitude will decrease compared to the summed amplitude. Thus, the stack amplitude provides a measure of the linearity (and therefore of the quality) of the spatial stack. The predetermined threshold used for comparing the stack amplitude and the summed amplitude may be stored in the second memory location 334.

A further technique for determining whether the predetermined condition is met may involve performing a comparison with another signal stacking technique. Thus, two signal processing techniques may be performed in parallel, so that they may be checked against one another. A first signal processing technique may be performed according to the present invention, to obtain a first value representative of the instantaneous frequency (i.e. from the R-P transform 326), whilst a second (different) signal processing technique may be performed to obtain a second value representative of the instantaneous frequency. The output of the R-P transform 326 may then be compared to the second value representative of the instantaneous frequency. If the output from the R-P transform 326 deviates from the second value representative of the instantaneous frequency by more than a threshold amount, then the predetermined condition may be determined to be met, and the relevant reference complex carrier signals may be updated. As an example, the second signal processing method may be the signal processing method described in GB 2588177 A with reference to FIG. 7 and claims 10-17 of that publication. In such a case, an output of the R-P transform 416 shown in FIG. 7 of GB 2588177 A may be compared with the output of the R-P transform 326 in FIG. 3 of the present application. The predetermined condition may be met if the outputs from the two R-P transforms deviate by more than a predetermined threshold amount. As another example, the second signal processing method may be a phase domain processing method. In such a case, a value of the instantaneous frequency may be determined from the phase domain processing method, and compared with the output of the R-P transform 326.

In order to recover the phase of the acoustic field which is affecting the optical path at the corresponding scattering locations, a sum over time may then be performed. This is a sum of the value representative of the instantaneous frequency obtained for the two or more spatial channels and the reference value of the instantaneous frequency stored in the first memory location 330 for those two or more spatial channels. Thus, the latest value representative of the instantaneous frequency is summed with the reference value of the instantaneous frequency. This provides an indication of the spatial differential of the phase difference, which is indicative of the phase of the acoustic field.

Figure 8:
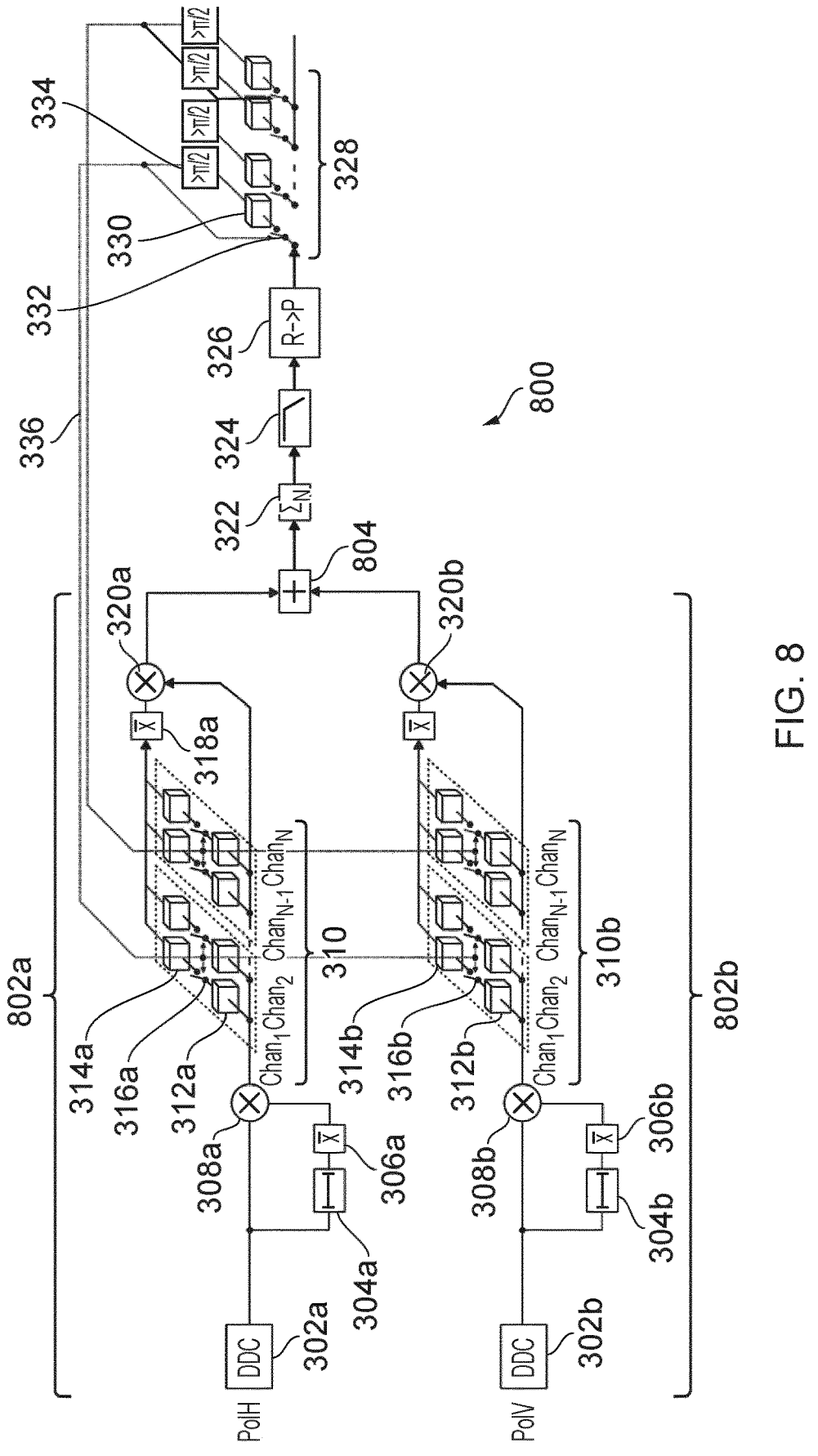
FIG. 8 shows a schematic diagram of a signal processing method according to an embodiment of the invention.

FIG. 8 shows a schematic diagram 800 illustrating the steps involved in a signal processing method that is another embodiment of the invention. The method of FIG. 8 is based on the same principles as the method of FIG. 3. Thus, features in FIG. 8 which correspond to those discussed above in relation to FIG. 3 are given corresponding reference numerals in FIG. 8, and operate in a similar manner to those discussed above in relation to FIG. 3. However, the method of FIG. 8 is configured to process signals corresponding to two different polarisation states obtained from a polarisation diverse detection system. In particular, as shown in FIG. 8, there are two parallel branches 802a, 802b, each corresponding to a respective polarisation state. Each branch 802a, 802b is configured to generate a third complex carrier for each spatial channel of the system, in the same manner as discussed above in relation to FIG. 3. Thus, the first branch 802a results in a third complex carrier signal for the first polarisation state being generated for each spatial channel, and the second branch 802b results in a third complex carrier signal for the second polarisation state being generated for each spatial channel. Accordingly, a third complex carrier signal for the first polarisation state and a third complex carrier signal for the second polarisation state is generated for each spatial channel.

The first branch 802a includes a first digital down converter 302a, which may take as an input an interference signal corresponding to the first polarisation state. For example, the output from the analog-to-digital converter 32a discussed above may be used as the input for the first digital down converter 302a, which then generates a first complex carrier signal. The first complex carrier signal is then processed in the first branch 802a in the same manner as discussed above in relation to FIG. 3, to generate a third complex carrier signal for the first polarisation state. Likewise, the second branch 802b includes a second digital down converter 302b, which may take as an input an interference signal corresponding to the second polarisation state. For example, the output from the analog-to-digital converter 32b discussed above may be used as the input for the second digital down converter 302b, which then generates a first complex carrier signal. The first complex carrier signal is then processed in the second branch 802b in the same manner as discussed above in relation to FIG. 3, to generate a third complex carrier signal for the second polarisation state.

Following generation by the first and second branches 802a, 802b of a third complex carrier signal for the first polarisation state and a third complex carrier signal for the second polarisation state is generated for a spatial channel, a sum 804 of the two third complex carrier signals for that channel is performed. The sum 804 may be referred to as a polarisation 'stack', as it corresponds to summing the third complex carrier signals across multiple polarisation states for a given spatial channel. Similarly to the discussion above in relation to the spatial stack, modulating the third complex carrier signal of each polarisation state as described may have the effect of aligning the phasors representing the third complex carrier signals for both polarisation states. Thus, for a given spatial channel, the phasors of the third complex carrier signals for both polarisation states may be aligned, such that the third complex carrier signals can be constructively summed together, in order to provide an improved SNR.

Following the sum 804, a spatial stack 322 of the summed third complex carrier signals is performed, in the same way as discussed in relation to FIG. 3. In particular, polarisation stacked third complex carrier signals for two or more adjacent spatial channels are summed together, in order to generate a fourth complex carrier signals associated with those two or more spatial channels. The fourth complex carrier signal is then processed in the same way as discussed in relation to FIG. 3, to obtain a value representative of the instantaneous frequency of acoustic modulation at locations on the optical path corresponding to the two or more spatial channels. Furthermore, as in FIG. 3, the determined value of the instantaneous frequency is analysed to determine if it meets a predetermined condition. If the predetermined condition is met, then the reference complex carrier signals associated with those two or more spatial channels are updated, for each polarisation state.

Thus, the method shown in FIG. 8 operates in a similar manner to that of FIG. 3, however involves performing a polarisation stack in addition to the spatial stack. The combination of polarisation and spatial stacking of signals may result in a highly improved SNR for the system.

Figure 9:
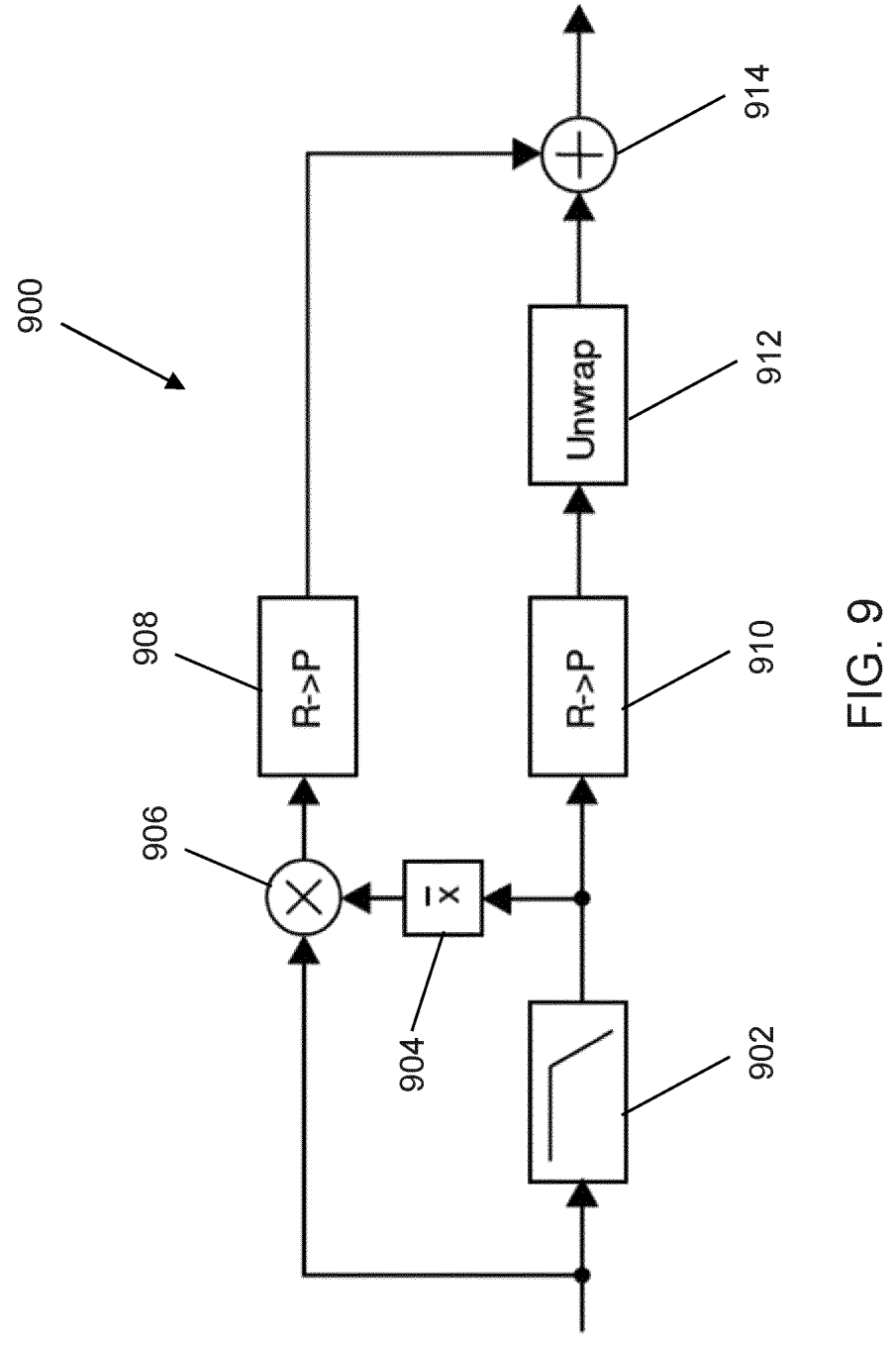
FIG. 9 shows a schematic diagram of part of a signal processing method according to an embodiment of the invention.

FIG. 9 shows a schematic diagram 900 of part of a signal processing method according to an embodiment of the invention. The steps illustrated in schematic diagram 900 may be performed after a spatial stack over multiple spatial channels has been performed, in order to obtain a value representative of the instantaneous frequency from the fourth complex carrier signal. For example, the steps of schematic diagram 900 can be implemented following the spatial stack 322 shown in FIGS. 3 and 8, e.g. replacing the filter 324 and R-P transform 326.

Following generation of the fourth complex carrier signal by the spatial stack 322, the fourth complex carrier signal may be split into two copies. A first copy is then passed through a low pass filter 902, which may be a dual filter operating on the real and imaginary components of the signal (e.g. an 'IQ' filter). For example, the filter 902 may be implemented using a moving average, an infinite impulse response (IIR), a finite impulse response (FIR), or any other suitable digital filter. The output of the filter 902 is then itself spit into two copies.

A first copy of the output of the filter 902 undergoes complex conjugation 904 and is multiplied 906 by the second (full bandwidth) copy of the fourth complex carrier signal. The multiplication 906 has the effect of removing a bias of the signal within the bandwidth of the low pass filter 902, such that an output of the multiplication 906 is a fifth complex carrier signal including only high frequency components of the fourth complex carrier signal. The fifth complex carrier signal is then passed through a first R-P transform 908, which outputs high frequency phase components of the signal.

A second copy of the output of the filter 902 corresponds to a sixth complex carrier signal including only low frequency components of the fourth complex carrier signal. The sixth complex carrier signal is passed through a second R-P transform 910, which outputs low frequency phase components of the signal. A phase unwrapping process 912 is then performed on the output of the R-P transform 910. Any suitable phase unwrapping process may be used. The phase unwrapping process 912 has the effect of converting a wrapped phase signal into a continuous phase signal, i.e. without $2\pi$ jumps in the signal. The high frequency phase components output from the first R-P transform 908 and the low frequency phase components output from the phase unwrapping process 912 are recombined at stage 914 (e.g. by summing the high frequency and low frequency components together), to provide an angle of the instantaneous frequency.

The process illustrated in schematic diagram 900 takes advantage of the realisation that, for most DAS applications, the low frequency components of the fourth complex carrier signal typically have larger amplitude and better SNR compared to the high frequency components. Thus, the phase unwrapping process is performed on a lower bandwidth, higher SNR, part of the fourth complex carrier signal. As a result, the process illustrated in schematic diagram 900 may allow a higher tolerance to phase unwrapping errors, thus producing a more reliable value of the instantaneous frequency.

The signal processing methods of the invention have been described above with reference to schematic diagrams representing the methods. In practice, the signal processing methods of the invention may be implemented using a controller (or other computing device) having software installed thereon, and configured to cause the controller to perform the described steps.

Although a few preferred embodiments have been shown and described, it will be appreciated by those skilled in the art that various changes and modifications might be made without departing from the scope of the invention, as defined in the appended claims.

All of the features disclosed in this specification (including any accompanying claims, abstract and drawings), and/or all of the steps of any method or process so disclosed, may be combined in any combination, except where at least some of such features and/or steps are mutually exclusive.

Each feature disclosed in this specification (including any accompanying claims, abstract and drawings) may be replaced by alternative features serving the same, equivalent or similar purposes, unless expressly stated otherwise. Thus, unless expressly stated otherwise, each feature disclose is one example only of a generic series of equivalent or similar features.

The invention is not restricted to the details of the foregoing embodiment (s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A signal processing method for a distributed acoustic sensing system, the method comprising:

receiving, at a detector stage, a set of scattered signals, wherein each scattered signal in the set of scattered signals corresponds to a respective spatial channel and was scattered at a respective location along an optical path;

receiving, at the detector stage, a local oscillator signal;

for each of the spatial channels:

generating, based on an interference of the local oscillator signal and the scattered signal corresponding to that spatial channel, a first complex carrier signal associated with that spatial channel, the first complex carrier signal being modulated by a phase difference between the local oscillator signal and the scattered signal corresponding to that spatial channel;

processing the first complex carrier signal to generate a second complex carrier signal associated with that spatial channel, the second complex carrier signal being modulated by a spatial differential of the phase difference, the spatial differential being taken along a length of the optical path;

storing an initial second complex carrier signal generated for that spatial channel as a reference complex carrier signal for that spatial channel; and generating a third complex carrier signal associated with that spatial channel, the third complex carrier signal being modulated by a phase difference between the second complex carrier signal and the reference complex carrier signal;

summing two or more third complex carrier signals associated with two or more respective spatial channels, to generate a fourth complex carrier signal;

determining, based on the fourth complex carrier signal, a value representative of an instantaneous frequency of an acoustic modulation at locations on the optical path corresponding to the two or more respective spatial channels;

determining if the value representative of the instantaneous frequency meets a predetermined condition and, if the predetermined condition is met:

for each of the two or more respective spatial channels, saving the second complex carrier signal associated with that spatial channel as the reference complex carrier signal for that spatial channel.

2. A method according to claim 1, wherein determining the value representative of the instantaneous frequency includes applying a rectangular to polar coordinate transform to the fourth complex carrier signal.

3. A method according to claim 1, wherein generating the third complex carrier signal comprises multiplying the second complex carrier signal with a complex conjugate of the reference complex carrier signal.

4. A method according to claim 1, wherein the predetermined condition is met if the value representative of the instantaneous frequency is greater than a predetermined threshold value.

5. A method according to claim 1, further comprising:

storing a reference value of the instantaneous frequency associated with the two or more respective spatial channels; and comparing the value representative of the instantaneous frequency to the reference value, to determine if the predetermined condition is met.

6. A method according to claim 5, further comprising, if the predetermined condition is met, storing the value representative of the instantaneous frequency as the reference value associated with the two or more respective spatial channels.

7. A method according to claim 5, wherein:

the value representative of the instantaneous frequency comprises an angle of the instantaneous frequency, and the reference value of the instantaneous frequency comprises a reference angle; and the predetermined condition is met if a difference between the angle of the instantaneous frequency and the reference angle exceeds a predetermined threshold.

8. A method according to claim 1, further comprising:

determining, as a stack amplitude, an amplitude of a phasor representing the fourth complex carrier signal;

determining, for each of the two or more respective spatial channels, an amplitude of a phasor representing the third complex carrier signal associated with that spatial channel;

determining, as a summed amplitude, a sum of the amplitudes of the phasors representing the third complex carrier signals associated with the two or more respective spatial channel; and comparing the stack amplitude and the summed amplitude, to determine if the predetermined condition is met.

9. A method according to claim 8, wherein the predetermined condition is met if a difference between the summed amplitude and stack amplitude exceeds a predetermined threshold.

10. A method according to claim 1, wherein determining if the value representative of the instantaneous frequency meets the predetermined condition includes comparing the value representative of the instantaneous frequency with a second value representative of the instantaneous frequency, wherein the second value representative of the instantaneous frequency was determined using a different signal processing method.

11. A method according to claim 1, wherein determining the value representative of the instantaneous frequency comprises:

splitting the fourth complex carrier signal into a fifth complex carrier signal and a sixth complex carrier signal, wherein the fifth complex carrier signal comprises a high frequency component of the fourth complex carrier signal, and the sixth complex carrier signal comprises a low frequency component of the fourth complex carrier signal;

applying a first rectangular to polar coordinate transform to the fifth complex carrier signal;

applying a second rectangular to polar coordinate transform to the sixth complex carrier signal;

performing a phase unwrapping process on an output of the second rectangular to polar coordinate transform; and combining an output of the first rectangular to polar coordinate transform and an output of the phase unwrapping process.

12. A method according to claim 1, wherein each of the respective locations at which the scattered signals were scattered is located within a chosen length of the optical path.

13. A method according to claim 1, further comprising:

splitting the local oscillator signal or each of the scattered signals into a first polarisation state and a second polarisation state;

performing, for each polarisation state, the steps for generating a third complex carrier signal associated with a spatial channel, to generate for each spatial channel a third complex carrier signal corresponding to the first polarisation state and a third complex carrier signal corresponding to the second polarisation state; and for each spatial channel, summing the third complex carrier signal corresponding to the first polarisation state and the third complex carrier signal corresponding to the second polarisation state, to generate a summed third complex carrier signal for each spatial channel;

wherein generating the fourth complex carrier signal comprises summing two or more summed third complex carrier signals associated with two or more respective spatial channels.

14. A distributed acoustic sensing system comprising:

a detector stage configured to receive a set of scatter signals that were scattered at locations along an optical path; and a controller configured to perform a method according to claim 1.

\* \* \* \* \*